United States Patent
Ohsawa et al.

[11] Patent Number: 5,875,039
[45] Date of Patent: Feb. 23, 1999

[54] IMAGE PROCESSING METHOD AND APPARATUS

[75] Inventors: Hidefumi Ohsawa, Kawaguchi; Yasuji Hirabayashi, Kawasaki, both of Japan

[73] Assignee: Canon Kabushiki Kaisha, Tokyo, Japan

[21] Appl. No.: 763,626

[22] Filed: Dec. 4, 1996

Related U.S. Application Data

[63] Continuation of Ser. No. 379,742, Jan. 27, 1995.

[30] Foreign Application Priority Data

| Feb. 1, 1994 | [JP] | Japan | 6-010655 |
| Feb. 1, 1994 | [JP] | Japan | 6-010656 |
| Feb. 1, 1994 | [JP] | Japan | 6-010657 |

[51] Int. Cl.$^6$ ............... H04N 1/415; H04N 7/12
[52] U.S. Cl. ............... 358/435; 358/432; 358/427; 358/450; 358/451; 348/403; 348/404; 348/384; 348/581; 382/232; 382/250; 382/248; 382/298
[58] Field of Search ............... 358/433, 450, 358/427, 432; 348/403, 404, 384, 581; 382/232, 250, 248, 298

[56] References Cited

U.S. PATENT DOCUMENTS

| 5,159,468 | 10/1992 | Yoshida et al. | 358/341 |
| 5,168,375 | 12/1992 | Reisch et al. | 358/432 |
| 5,251,254 | 10/1993 | Tanigawa et al. | 379/165 |
| 5,309,524 | 5/1994 | Hirabayashi et al. | 382/47 |

FOREIGN PATENT DOCUMENTS

| 0593013A2 | 10/1903 | European Pat. Off. |
| 2211691A | 10/1988 | European Pat. Off. |
| 2700036 | 11/1992 | European Pat. Off. |
| 1229560 | 9/1989 | Japan |
| WO 9515538 | 6/1995 | WIPO |

OTHER PUBLICATIONS

IEEE Transactions On Communications, Apr. 1983, USA, vol. COM–31, No. 4 ISSN 0090–6778, pp. 532–540, Burt P J et al "The Laplacian Pyramid As A Compact Image Code".

Patent Abstracts of Japan, vol. 017 No. 115 (E–1330), Mar. 10, 1993 & JP–A–04 297183 (Mitsubushi Electric Corp.) Oct. 21, 1992.

Patent Abstracts of Japan, vol. 018 No. 025 (M–1542), 14 Jan. 1994, & JP–A–05 261982 (Seiko Epson Corp) 12 Oct. 1993.

Patent Abstracts of Japan, vol. 018 No. 123 (E–1517), 28 Feb. 1994 & JP–A–05 316357 (Nippon Telegr & Teleph Corp) 26 Nov., 1993.

IEICE Transactions on Fundamentals of Electronics, Communications and Computer Sciences, Jul. 1993, Japan, vol. E76–A, No. 7, ISSN 0916–8508 pp. 1150–1153, Muramatsu S et al. "Scale Factor of Resolution Conversion Based On Orthogonal Transforms", p. 1150, right col. paragraph 3—p. 1151, left. col., paragraph 2.

Primary Examiner—Edward L. Coles
Assistant Examiner—Mark Wallerson
Attorney, Agent, or Firm—Fitzpatrick,Cella, Harper & Scinto

[57] ABSTRACT

When image data coded by a DCT coding method in a predetermined block size is to be decoded, an image processing apparatus extracts necessary DCT coefficients of a block on the basis of an enlargement/reduction ratio determined in advance, then decodes the extracted DCT coefficients. Thereby it is possible to produce a reduced image at high speed without using a memory of high capacity.

49 Claims, 32 Drawing Sheets

FIG. 3

| SSSS GROUP NUMBER | DIFFERENCE OF DC COMPONENTS | ADDITIONAL BIT NUMBER |
|---|---|---|
| 0 | 0 | 0 |
| 1 | -1, 1 | 1 |
| 2 | -3, -2, 2, 3 | 2 |
| 3 | -7...-4, 4...7 | 3 |
| 4 | -15...-8, 8...15 | 4 |
| 5 | -31...-16, 16...31 | 5 |
| 6 | -63...-32, 32...63 | 6 |
| 7 | -127...-64, 64...127 | 7 |
| 8 | -255...-128, 128...255 | 8 |
| 9 | -511...-256, 256...511 | 9 |
| 10 | -1023...-512, 512...1023 | 10 |
| 11 | -2047...-1024, 1024...2047 | 11 |
| 12 | -4095...-2048, 2048...4095 | 12 |
| 13 | -8191...-4096, 4096...8191 | 13 |
| 14 | -16383...-8192, 8192...16383 | 14 |
| 15 | -32767...-16384, 16384...32767 | 15 |

FIG. 5

| | | | | | | | |
|---|---|---|---|---|---|---|---|
| 0 | 1 | 5 | 6 | 14 | 15 | 27 | 28 |
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 6

| DC | AC |
|---|---|
| 1 | 63 |

| ENLARGEMENT/ REDUCTION RATIO Z | NUMBER OF NECESSARY AC COEFFICIETS | SIZE OF MATRIX SUBJECT TO INVERSE DCT PROCESS |
|---|---|---|
| 1/8 | 0 | 1 × 1 |
| 2/8 | 4 | 2 × 2 |
| 3/8 | 12 | 3 × 3 |
| 4/8 | 24 | 4 × 4 |
| 5/8 | 39 | 5 × 5 |
| 6/8 | 51 | 6 × 6 |
| 7/8 | 59 | 7 × 7 |
| 8/8 | 63 | 8 × 8 |

FIG. 16A
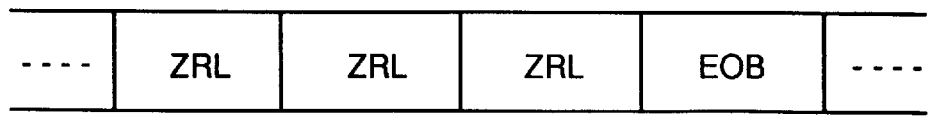
FIG. 16B
FIG. 17
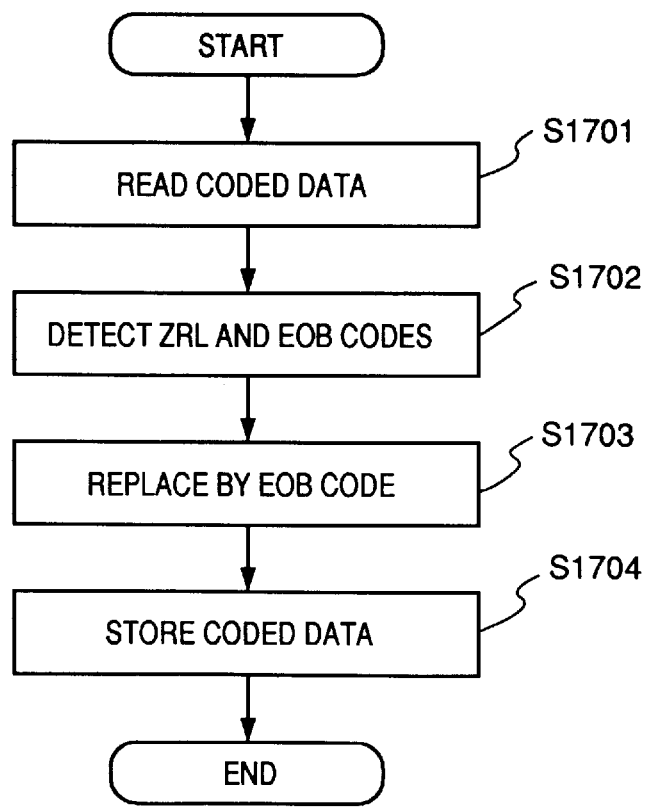

FIG. 22

| ENLARGEMENT/ REDUCTION RATIO | DESIGNATION OF PROCESS |
|---|---|
| $0 < Z \leq \frac{1}{8}$ | REDUCE FROM 1/8 |
| $\frac{1}{8} < Z \leq \frac{3}{16}$ | ENLARGE FROM 1/8 |
| $\frac{3}{16} < Z \leq \frac{2}{8}$ | REDUCE FROM 2/8 |
| $\frac{2}{8} < Z \leq \frac{5}{16}$ | ENLARGE FROM 2/8 |
| $\frac{5}{16} < Z \leq \frac{3}{8}$ | REDUCE FROM 3/8 |
| $\frac{3}{8} < Z \leq \frac{7}{16}$ | ENLARGE FROM 3/8 |
| $\frac{7}{16} < Z \leq \frac{4}{8}$ | REDUCE FROM 4/8 |
| $\frac{4}{8} < Z \leq \frac{9}{16}$ | ENLARGE FROM 4/8 |
| $\frac{9}{16} < Z \leq \frac{5}{8}$ | REDUCE FROM 5/8 |
| $\frac{5}{8} < Z \leq \frac{11}{16}$ | ENLARGE FROM 5/8 |
| $\frac{11}{16} < Z \leq \frac{6}{8}$ | REDUCE FROM 6/8 |
| $\frac{6}{8} < Z \leq \frac{13}{16}$ | ENLARGE FROM 6/8 |
| $\frac{13}{16} < Z \leq \frac{7}{8}$ | REDUCE FROM 7/8 |
| $\frac{7}{8} < Z \leq \frac{15}{16}$ | ENLARGE FROM 7/8 |
| $\frac{15}{16} < Z \leq \frac{8}{8}$ | REDUCE FROM 8/8 |
| $Z > 1$ | ENLARGE FROM 8/8 |

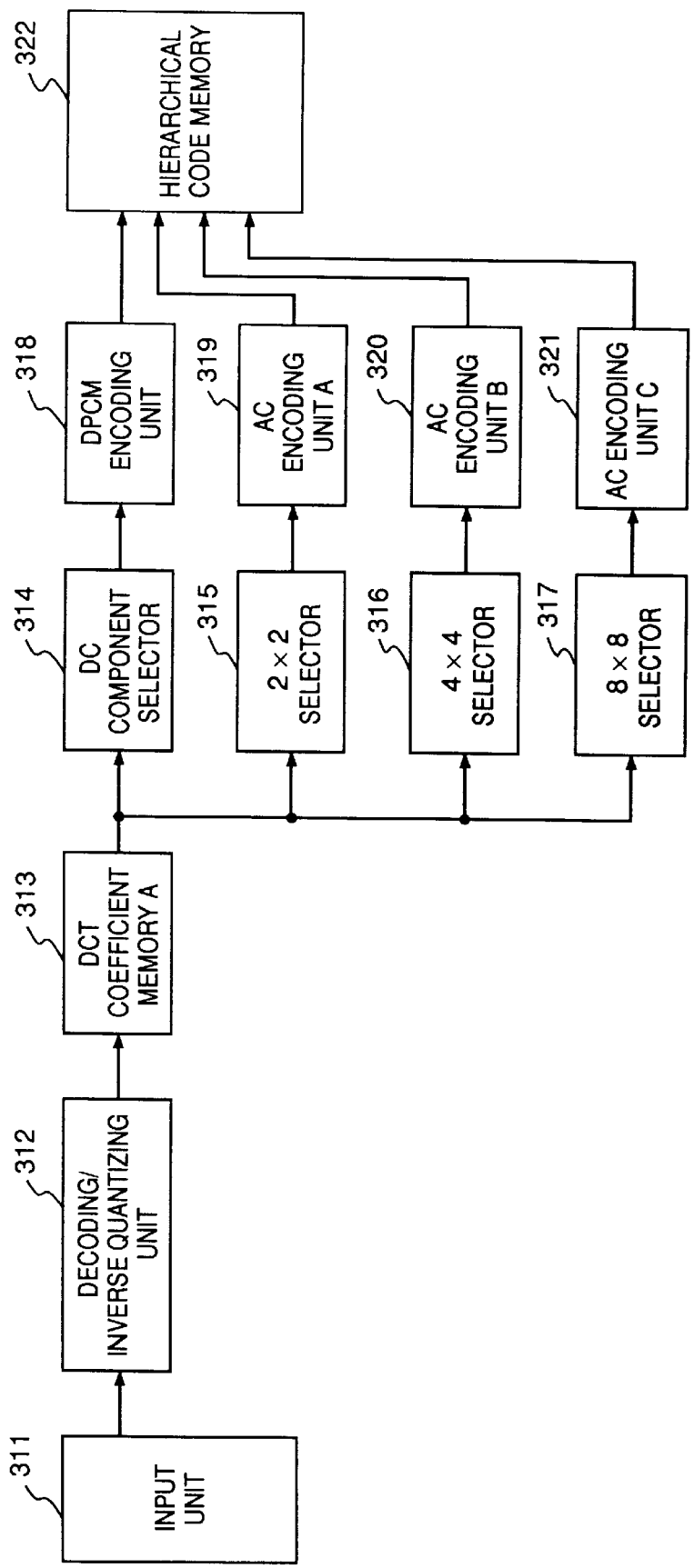

FIG. 26A

|    |    |    |    |    |    |    |    |
|----|----|----|----|----|----|----|----|
| DC | 1  | 5  | 6  | 14 | 15 | 27 | 28 |
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| ▨ | 1 |
|---|---|
| 2 | 3 |

FIG. 26D

| ▨ | ▨ | 1  | 6  |
|---|---|----|----|
| ▨ | ▨ | 5  | 7  |
| 2 | 4 | 8  | 11 |
| 3 | 9 | 10 | 12 |

FIG. 26E

|    |    |    |    | 1  | 6  | 7  | 20 |
|----|----|----|----|----|----|----|----|
|    |    |    |    | 5  | 8  | 19 | 21 |
|    |    |    |    | 9  | 18 | 22 | 33 |
|    |    |    |    | 17 | 23 | 32 | 34 |
| 2  | 4  | 10 | 16 | 24 | 31 | 35 | 42 |
| 3  | 11 | 15 | 25 | 30 | 36 | 41 | 43 |
| 12 | 14 | 26 | 29 | 37 | 40 | 44 | 47 |
| 13 | 27 | 28 | 38 | 39 | 45 | 46 | 48 |

IMAGE PROCESSING METHOD AND APPARATUS

This application is a continuation of application Ser. No. 08/379,742 filed Jan. 27, 1995.

BACKGROUND OF INVENTION

The invention relates to an image processing method and apparatus and, more particularly, to an image processing method and apparatus dealing with a digital image encoded by block.

Conventionally, in an image processing system which stores encoded image data and displays it on a monitor or the like, in order to obtain image data representing an image whose size is different from an original image, it has been common to perform enlargement or reduction after decoding the compressed original image data.

For example, to obtain an image of a smaller size (a reduced image) than the original image, the coded original image data is reproduced in an original size, then known interpolation processing, such as sub-sampling, has to be performed to complete the enlargement or reduction.

Conventional decoding and displaying processes will be explained below with reference to drawings.

FIG. 33 is a block diagram illustrating a constitution of a decoding and displaying processes in the conventional image processing apparatus.

In FIG. 33, encoded data, based on a discrete cosine transfer (DCT) using a block size of eight-pixel by eight-pixel, which is a block size of a still image standard encoding method, is stored in an image memory A 1501. The coded data is inputted to a decoding unit 1502, thereat the coded data is decoded in accordance with a decoding processing which will be described later. Then, the decoded data is stored in an image memory B 1503. Next, the decoded image data stored in the image memory B 1503 is inputted to an enlargement/reduction processing unit 1504 where the image data is applied to an enlargement/reduction process, such as a sub-sampling or such interpolation processing, based on an enlargement/reduction ratio designated by an enlargement/reduction ratio designator 1507. After the processes, the image data is stored in an image memory C 1505 for display (a display memory). Then, the processed data stored in the image memory C 1505 is displayed on a display 1506.

In FIG. 34, an example of a conventional decoding unit 1502 shown in FIG. 33 is illustrated.

In the decoding unit 1502, an 8×8 DCT coded data is decoded. In FIG. 34, the coded data is inputted to a Huffman decoding unit 1601 via an input terminal 1600, and decoded, then 8×8 DCT coefficients are reproduced. Next, the reproduced DCT coefficients are inputted into an inverse DCT unit 1602 and applied with an inverse DCT process, then an image data of an 8×8 block size is reproduced. The reproduced image data is outputted to the image memory B 1503 in FIG. 33 via an output terminal 1603.

As described above, in a conventional image processing method and apparatus, all the DCT coded data is converted to image data of an original size by decoding the coded data, then enlarged or reduced.

However, according to the conventional method and apparatus described above, it takes considerable time to decode the encoded original image data. Further, it requires a memory of large capacity, such as the image memory B 1503 shown in FIG. 33, for temporary storing the original image data while processing it.

Therefore, by utilizing a hierarchical coding method having plural kinds of image data of different sizes in a single coded data, it is possible to encode at high speed without a memory of large capacity for temporary storing data.

As a typical hierarchical coding method used by a conventional image processing apparatus, there is the well-known Laplacean Pyramid coding method.

According to the Laplacean Pyramid coding method, an input image is hierarchically compressed from ½, ¼, ⅛, and so on, and at each hierarchy of the pyramid, a compressed image is coded by using the discrete cosine transfer, or the like. The order of encoding is to encode the most compressed image, then encode the difference between the image expanded to doubled the size of the decoded image corresponding to the most compressed image and the image compressed to the aforesaid "doubled" size obtained from the input image. The aforesaid process is repeated until the image size of the hierarchy which is the subject to encode and the input image becomes the same size, thereby coded data of multi-hierarchical images can be generated.

Coded data of each hierarchy of the hierarchical coding method, such as the Laplacean pyramid coding method as described above, is generated by coding a part of the decoded original image data. Then, by decoding coded data of each hierarchy, the lower hierarchical image can be obtained as, for instance, a reduced image.

Further, not only the aforesaid hierarchical coding method but also a sequential coding method in which an input image is sequentially coded from left to right and from top to bottom is widely known. Data coded by the sequential coding method is the same as data which is coded by the hierarchical coding method using only a single hierarchy.

Referring to FIGS. 35 and 36, a conventional hierarchical coding method will be described. FIG. 35 is a block diagram illustrating a structure of an image processing apparatus capable of using the conventional hierarchical coding method.

In FIG. 35, reference numeral 101 denotes a decoder, which reproduce RGB image data from image data, encoded by a DCT sequential encoder (not shown), as an input, by performing decoding, inverse-quantizing, inverse DCT, and color conversion. The RGB image data outputted from the decoder 101 is sub-sampled to a size of ½ in the vertical and horizontal directions by a sub-sampling unit A 102, thereby an image of ¼ (½×½) size of the original image is produced. At a sub-sampling unit B 103, the sub-sampled RGB image data is further sub-sampled to a ½ size in the vertical and horizontal directions, and a ¹⁄₁₆ (¼×¼) size image of the original image is produced. Furthermore, at a sub-sampling unit C 104, the RGB image data from the sub-sampling unit B 103 is further sub-sampled to a ½ size in the vertical and horizontal directions, then an image of ¹⁄₆₄ (⅛×⅛) size of the original image is obtained. The ⅛×⅛ size image outputted from the sub-sampling unit C 104 is encoded at a CODEC A 105 which generates coded data of ⅛×⅛ size. Further, the CODEC A 105 output locally decoded image data to an interpolation processing unit A 106. The interpolation processing unit A 106 applies interpolation processing on the decoded ⅛×⅛ size image data to expand it to a doubled size image data, then output the obtained data to a subtractor 107. The subtractor 107 finds the difference between the doubled ⅛×⅛ size image data outputted from the interpolation processing unit A 106 and the ¼×¼ size image data outputted from the sub-sampling unit B 103, then the obtained difference is outputted to a CODEC B 108. The CODEC B 108 encodes the ¼×¼ size image which is inputted from the subtractor 107, thus the difference between the ⅛×⅛ size image and the ¼×¼ size image is encoded, and ¼×¼ size coded data is generated. Further, the CODEC B 107 outputs the locally decoded image data to an adder 109. The adder 109 adds the ¼×¼ size image data from the CODEC B 108 to the ¼×¼ size image data outputted from the interpolation processing unit A 106, and the obtained sum is expanded to a doubled size image data at a interpolation processing unit B 110, then outputted to a subtractor 111. The subtractor 111 calculates difference between the doubled ¼×¼ size image data outputted from the interpolation processing unit B 110 and the ½×½ size image data outputted from the sub-sampling unit A 102, then the obtained difference is outputted to a CODEC C 112. The CODEC C 112 encodes the ½×½ size image inputted from the subtractor 111, in other words, the difference between the ¼×¼ size image and the ½×½ size image is encoded, then the CODEC C 112 generates ½×½ size coded data. Further, the CODEC C 112 outputs the locally decoded image data to an adder 113. The adder 113 adds the ½×½ size image data outputted from the CODEC C 112 to the ½×½ size image data from the interpolation processing unit B 110, the sum is expanded to a double size image data at a interpolation processing unit C 114, then outputted to a subtractor 115. The subtractor 115 finds the difference between the doubled ½×½ size image data outputted from the interpolation processing unit C 114 and the full size image data from the decoder 101, then the obtained difference is outputted to a CODEC D 116. The CODEC D 116 encodes the full size image inputted from the subtractor 115, in other words, the difference between the ½×½ size image and the full size image is encoded to generate full size coded data. The detailed configurations of CODEC A 105, the CODEC B 108, the CODEC C 112, and the CODEC D 116 in FIG. 35 are basically same except for the amount of memory which is used in each processing stage.

Next, referring to FIG. 36, the detailed configuration of a CODEC will be described. FIG. 36 is a block diagram showing the detailed configuration of the CODEC. In FIG. 36, an input image is a decoded RGB signal, and converted from the RGB signal to a luminance/color difference (YUV) signal at a color converter A 117, then applied with 8×8 DCT process on each color signal at a DCT unit 118. Next at a quantizing unit 119, the DCT coefficients obtained at the DCT unit 118 are linearly quantized, and are coded in accordance with the Huffman coding method at the encoding unit 120, thereby coded data is outputted. Whereas, the output from the quantizing unit 119 is also sent to an inverse-quantizing unit 121 to be inverse-quantized, and the processed data is changed to DCT coefficient data. Next at an inverse DCT unit 122, 8×8 inverse DCT process is applied to the DCT coefficient data, then a YUV signal is generated. Finally, the YUV signal is converted into a RGB signal at color converting unit B 123. The output via the inverse-quantizing unit 121, the inverse DCT unit 122, and the color converter B 123 are local decode output from each CODEC shown in FIG. 35.

According to the conventional hierarchical coding method as described above, sequential coding data is converted into, for instance, hierarchical coded data of four hierarchies. On the other hand, a process for converting from the hierarchical coded data into sequential coded data is performed by reversing the process which is described above.

In order to change sizes of an image represented by coded data, there is a method to obtain a n/8×n/8 (n≦8; n is a positive integer) size reduced image by extracted a n×n matrix portion from the 8×8 DCT coefficients. In other words, it is possible to obtain a ¼×¼ size reduced image data by extracting 2×2 DCT coefficients out of 8×8 DCT coefficients, and a ½×½ size reduced image data by extracting 4×4 DCT coefficients out of the 8×8 DCT coefficients, for example. Accordingly, it is possible to consider the zigzag scanned 8×8 DCT coefficients as a single sequential coded data.

According to this method, the image memory B 1503 and the enlargement/reduction processing unit 1504 of the conventional configuration shown in FIG. 33 become unnecessary, and image data outputted from the inverse DCT unit 1602 is directly outputted to the image memory C 1505, shown in FIG. 33, via the output terminal 1603. Note that, in this case, the enlargement/reduction ratio designator 1507 is connected to the inverse DCT unit 1602, shown in FIG. 34, of the decoding unit 1502.

In a reduction process as this, by terminating decoding process of the remained DCT coefficients at the completion of the Huffman decoding processing of n×n DCT coefficients which are required for inverse DCT process when decoding the 8×8 DCT coefficient block, the top position of the next DCT coefficient block is lost, which results in ruining the decoding process. Therefore, the entirely encoded 8×8 DCT coefficients have to be decoded. Thus, the decoding process requires quite a long time, and it has not been easy to speed up the decoding process.

Furthermore, in a case where the sequential coded data is converted into hierarchical coded data as described above with reference to FIGS. 35 and 36, or in a case where the hierarchical coded data is converted into sequential coded data, a memory of large capacity is required since all the coded data has to be decoded and convert into RGB image data. In addition, there is a problem in that image quality is often deteriorated because of quantized errors caused by coding and decoding in multi-hierarchy, and errors caused by color conversion.

SUMMARY OF THE INVENTION

Accordingly, it is an object of the present invention to provide an image processing method and apparatus capable of generating a reduced image of an original image from sequential coded data at high speed without using a memory of large capacity.

According to the present invention, the foregoing object is attained by providing an image processing apparatus comprising an image processing method by an image processing apparatus which decodes coded image data generated from encoding image data by a discrete cosine transform (DCT) coding method as a predetermined block unit, comprising: a ratio setting step of setting an enlargement/reduction ratio; an extracting step of extracting DCT coefficients to be decoded on the basis of the ratio set at the ratio setting step in a single block; a decoding step of decoding the DCT coefficients extracted at the extracting step; an inverse DCT step of reproducing an image by applying inverse DCT to the DCT coefficients decoded at the decoding step; and a pointing step of moving a pointer to a start position of a next block after the inverse DCT of a single block is completed by the inverse DCT step.

In accordance with the present invention as described above, Huffman codes in a portion of DCT coefficients whose sizes are decided in accordance with a predetermined reduction ratio out of a DCT coefficient block are decoded, and when a necessary number of codes are decoded, a pointer is moved to the top of the next block at high speed, then decoding of the next block starts. Further, image data is obtained by applying the inverse DCT process on the obtained DCT coefficients.

Accordingly, it is another object of the present invention to provide an image forming method and apparatus capable of performing reduction process in accordance with an arbitrary reduction ratio without using a memory of large capacity when a hierarchical coding method is employed.

According to the present invention, the foregoing object is attained by providing an image processing apparatus comprising an image processing method by an image processing apparatus which decodes and outputs an coded image data encoded by a hierarchical coding method by N×N block unit (N is a positive integer), comprising: a ratio setting step of setting an enlargement/reduction ratio Z; a hierarchy setting step of setting a hierarchy n (n is a positive integer) such that n/N (n≦N) becomes closest to the ratio Z set at the ratio setting step; a decoding step of decoding the coded image data into data of a n/N×n/N size on the basis of the hierarchy n set at the hierarchy setting step; and an enlargement/reduction step of changing sizes of the image data decoded at the decoding step so as to correspond to the ratio Z set at the ratio setting step.

In accordance with the present invention as described above, regarding coded data of plural hierarchies, when coded data whose hierarchy is closer to the designated reduction ratio is decoded, and reduced or enlarged in accordance with the designated reduction ratio, then a desired size image data is obtained.

Accordingly, it is another object of the present invention to provide an image processing method and apparatus capable of performing reversible conversion at high speed between sequential code and hierarchical code without using a memory of large capacity.

According to the present invention, the foregoing object is attained by providing an image processing apparatus comprising an image processing method comprising: a decoding step of decoding coded data into M×M DCT coefficients(M is a positive integer); a DCT coefficient extracting step of extracting N×N DCT coefficients (N is a positive integer) out of the M×M DCT coefficients (N<M); a hierarchical coding step of generating hierarchical coded data by encoding the N×N DCT coefficients extracted at the DCT coefficient extracting step; and a hierarchical decoding step of decoding the hierarchical coded data encoded at the hierarchical coding step to obtain N×N DCT coefficients.

In accordance with the present invention as described above, a sequential code is decoded to DCT coefficients, and by dividing the DCT coefficients into plural hierarchies and coding the coefficients again, a hierarchical code is obtained. Further, by decoding a hierarchical code into DCT coefficients and coding them by reconstructing the highest hierarchy, a sequential code is obtained.

The invention is particularly advantageous since it is possible to generate a compressed image of an original from DCT coded data at high speed without using a memory of large capacity.

Further, it is possible to perform enlargement/reduction process on hierarchical coded data at high speed in accordance with an arbitrary enlargement/reduction ratio without using a memory of large capacity.

Furthermore, it is possible to provide an image processing method and apparatus capable of converting between sequential coded data and hierarchical coded data without quality of an image being deteriorated and without using a memory of large capacity.

Further, since the required memory capacity for the apparatus is reduced, it is possible to reduce cost in the manufacture of an image processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows examples of grouping DC differences in the DC component decoding process by the Huffman decoding unit according to the first embodiment;

FIG. 5 shows an order of zigzag scanning of a DCT coefficient matrix according to the first embodiment;

FIG. 6 shows a construction of the DCT coefficients data according to the first embodiment;

FIG. 8 is an example of a table to be used in a DCT matrix selector according to the first embodiment;

FIGS. 16A and 16B show redundancy of coded data according to a fourth embodiment of the present invention;

FIG. 17 is a flowchart of illustrating process of adjusting redundancy of the coded data according the fourth embodiment;

FIG. 22 is an example of an enlargement/reduction ratio table according to a seventh embodiment of the present invention;

FIG. 25 is a block diagram showing a configuration of a hierarchical encoding unit according to a ninth embodiment of the present invention;

FIGS. 26A to 26E show an example of zigzag scanning of DCT coefficients according to the ninth embodiment;

DETAILED DESCRIPTION OF THE PREFERRED EMBODIMENT(S)

Preferred embodiment of the present invention will be described in detail in accordance with the accompanying drawings.

<First Embodiment>

Figure 1:
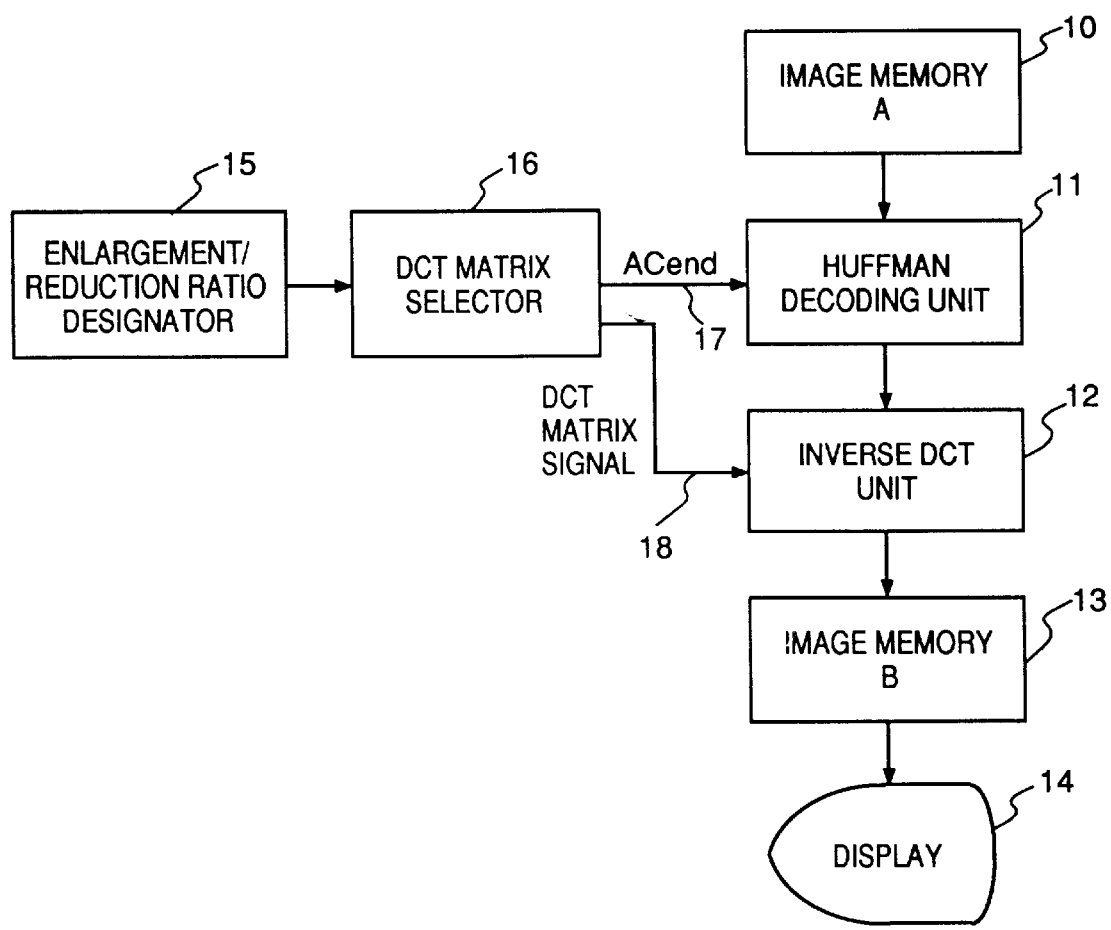
FIG. 1 is a block diagram showing a structure of an image processing apparatus according to a first embodiment of the present invention.

FIG. 1 is a block diagram illustrating an example of a structure of a unit which encodes and displays in an image processing apparatus according to a first embodiment.

In FIG. 1, reference numeral 10 denotes an image memory A, and stores 8×8 DCT coded data, especially data encoded by an ADCT method defined in JPEG. The coded data is sent from the image memory A 10 to a Huffman decoding unit 11, thereat decoded to DCT coefficients for each block with reference to an ACend signal 17 which will be explained later. The Huffman decoding unit 11 in the first embodiment will be explained later in detail. It should be noted that if decoding process of DCT coefficients is terminated in the middle of the process, the decoding process of the next block can start. Then, the DCT coefficients decoded in the Huffman decoding unit 11 is sent to an inverse DCT unit 12. The inverse DCT unit 12 is able to perform inverse DCT process of n×n size ($n \leq 8$; n is a positive integer) referring to a DCT matrix signal 18, which will be described later, and an image data is reproduced by applying the inverse DCT process on the DCT coefficients inputted from the Huffman decoding unit 11, and outputted to an image memory B 13. The image memory 13 is for storing image data necessary for display, and a display 14 displays an image based on the image data stored in the image memory B 13.

Reference numeral 15 denotes an enlargement/reduction ratio designator (referred as "ratio designator" hereinafter) for designating an enlargement or reduction ratio (referred as "ratio" hereinafter) between an image to be reproduced and an original image. The ratio designator 15 decides the ratio Z, and outputs it to a DCT matrix selector 16. The DCT matrix selector 16 comprises tables for the ACend signal 17 which sets the number of DCT coefficients to be reproduced and a DCT matrix signal 18 which sets a DCT matrix to be used for the inverse DCT process, and selects proper signals from each table depending upon the ratio Z. Then the DCT matrix selector outputs the selected ACend signal 17 to the Huffman decoding unit 11, and the selected DCT matrix signal to the inverse DCT unit 12.

Next, the decoding process of a DC component of the DCT coded data obtained from the Huffman decoding unit 11 shown in FIG. 1, is explained with reference to a flowchart in FIG. 2.

First, at step S20, a group number n which represents difference between the DC components of the DCT coefficients is obtained from a Huffman coding table (not shown). At step S21, additional bits representing the ordinal number of differences between DC components in the current and the prior blocks in the group is decoded, then the difference of DC components is determined by referring to a grouping table, described below, of differences between DC components in the current and the prior blocks.

An example of the grouping table of differences between DC components according to the first embodiment is shown in FIG. 3.

In FIG. 3, a group number 2 contains "−3, −2, 2, 3", for instance, and two additional bits indicate ordinal number, "0, 1, 2, 3", corresponding to the members of the group number 2 are required. Thus, from the combination of the group number and the additional bits, the difference of DC components can be determined. Likewise, a group number 3 contains members of "−7, −6, −5, −4, 4, 5, 6, 7", and the difference of DC component to be shown in the group number 3 is decided in accordance with three additional bits.

Figure 2:
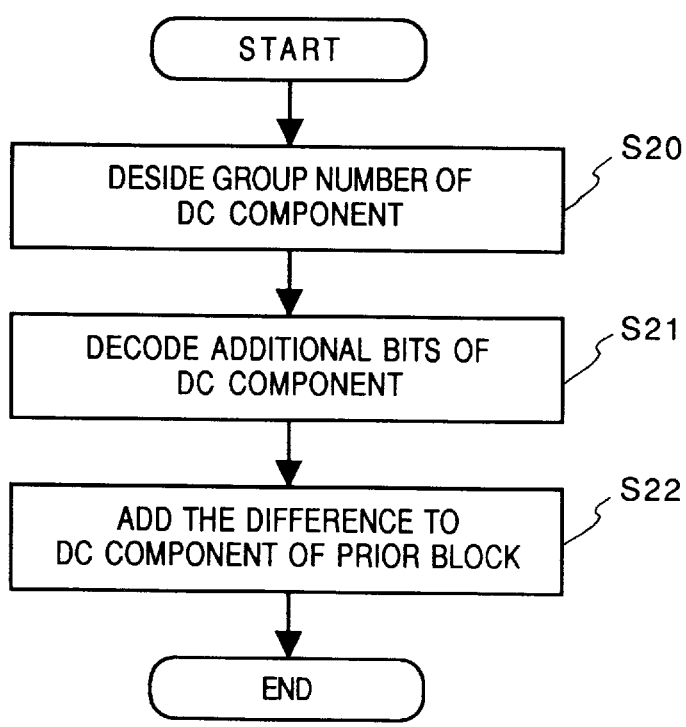
FIG. 2 is a flowchart explaining DC component decoding process by a Huffman decoding unit according to the first embodiment.

Then, at step S22 in FIG. 2, the difference between DC components in current and prior blocks obtained at step S21 is added to a DC component of the prior DCT coded data block, thereby a DC component of the DCT coded data block, namely, a zero-th coefficient of the DCT coded data block is determined.

As described above, decoding process of a DC component which is a part of decoding process of DCT coded data by the Huffman coding unit 11 in FIG. 1 is performed.

Next, decoding process of AC components is explained with reference to flowchart in FIG. 4.

Figure 4:
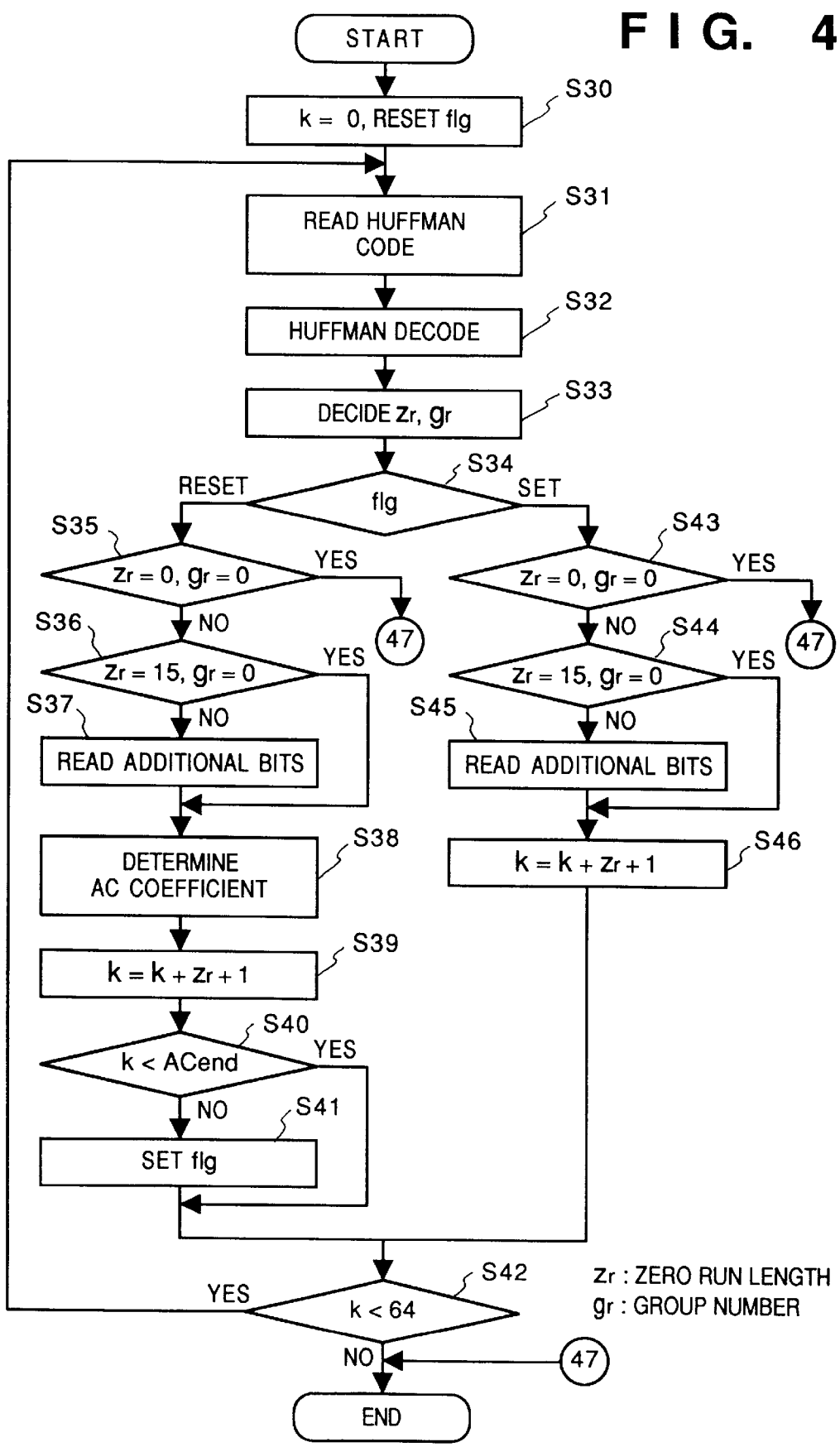
FIG. 4 is a flowchart illustrating AC component decoding process by the Huffman decoding unit according to the first embodiment.

FIG. 4 is the flowchart explaining the decoding process which is a part of the decoding process of the DCT coded data by the Huffman coding unit 11 in FIG. 1, of AC components.

First, at step S30, a pointer "k" indicating the position of the last DCT coefficient decoded and a flag (referred as "flg") indicating that necessary DCT coefficients have been decoded are reset. Next, at step S31, a coded data block is read, and at step S32, a first decoding is processed on an AC component which is designated by the pointer k by using the Huffman table (not shown) for AC components. At step S33, a zero run length (referred as "zr") and a group number (referred as "gr") are determined in accordance with the first decoded value of the AC component obtained at step S32 by using the Huffman table for AC components. Then, at step S34, the flag "flg" is examined, and if the flag "flg" is reset, in other words, if decoding of the necessary DCT coefficients process is not yet completed, the process moves to step S35.

At step S35, whether or not zr=0 and gr=0, in other words, whether or not an AC component, indicated by the pointer k, which is under the decoding process indicates an end of block (EOB) code is determined, and if EOB, the process is completed, whereas, if not EOB, the process moves to step S36.

At step S36, whether or not zr=15 and gr=0, namely, whether or not the AC component, indicated by the pointer k, which is under the decoding process is "0" and the run length indicates 15 (altogether make ZRL) are determined. If not ZRL, then process moves to step S37, whereas, if ZRL, since there is not any additional bit, step S37 is skipped and the process proceeds to step S38.

At step S37, additional bits are read. At step S38, an AC component is determined in accordance with a grouping table (not shown) for AC components. Next at step S39, by adding the sum of zr+1 to the pointer k, the position of the last DCT coefficient which has been already processed is updated. It should be noted that zr=1 indicates that an effective coefficient (a coefficient which is not "0") follows after a single "0", for example, and the position of the last DCT coefficient processed advances by 2.

At step S40, whether or not the pointer k indicating the position of the last DCT coefficient which has been already processed exceeds a number of the necessary DCT coefficients, ACend, which is a threshold. If the pointer k is larger or equal to the ACend, then the flag "flg" is set at step S41 and the process moves to S42. Whereas if the pointer k is less than the ACend, the process moves to S42 directly.

At step S42, whether or not the pointer k indicating the position of the last DCT coefficient which has been already processed exceeds a maximum value, 64, is examined. If the pointer k is greater or equal to 64, then the process goes to end, whereas, if the pointer k is less than 64, then the process goes back to step S31, and next decoding process of an AC component starts.

On the other hand, if the flag "flg" is set at step S34, then the process moves to step S43, and steps S43 to S46, which are the identical processes of step S35 to 39, are performed. After step S46, the process proceeds to step S42. Therefore, when a flag is set, an operation to determine the value of an AC component is not performed.

In the decoding process of AC components according to the first embodiment as described above, when decoding process of necessary AC components has been completed, a flag is set, and if the flag is set, the operation for determining a value of an AC component can be omitted.

Therefore, according to the decoding process of AC components in the first embodiment, it is possible to shorten the processing time depending upon the block size to be decoded. Further, since the decoding process is performed without losing the position of the end of a DCT coefficient block, all the DCT coefficient blocks are decoded efficiently.

FIG. 5 shows a position order of DCT coefficients in a block, decoded by the Huffman decoding unit 11 in FIG. 1.

The position order of the DCT coefficient block in FIG. 5 is also an order of so called zigzag scanning. Regarding each DCT coefficient in the 8×8 block, a DC component is placed at a left upper position in the block, i.e., a position 0, then AC components are placed at positions 1 to 63 as shown in FIG. 5.

Next, referring to FIGS. 6 and 7, a process to reproduce image data by performing inverse DCT process on the DCT coefficients decoded by the Huffman decoding unit 11 in FIG. 1, and to store the image data in an image memory B 13 will be described.

FIG. 6 shows a construction of a single block of DCT coefficient data decoded by the Huffman decoding unit 11 in FIG. 1. The single block of DCT coefficient data has a DC component at the top of the block followed by AC components. In the first embodiment, a number of AC components in a single block is 63, as shown in FIG. 5.

Figure 7:
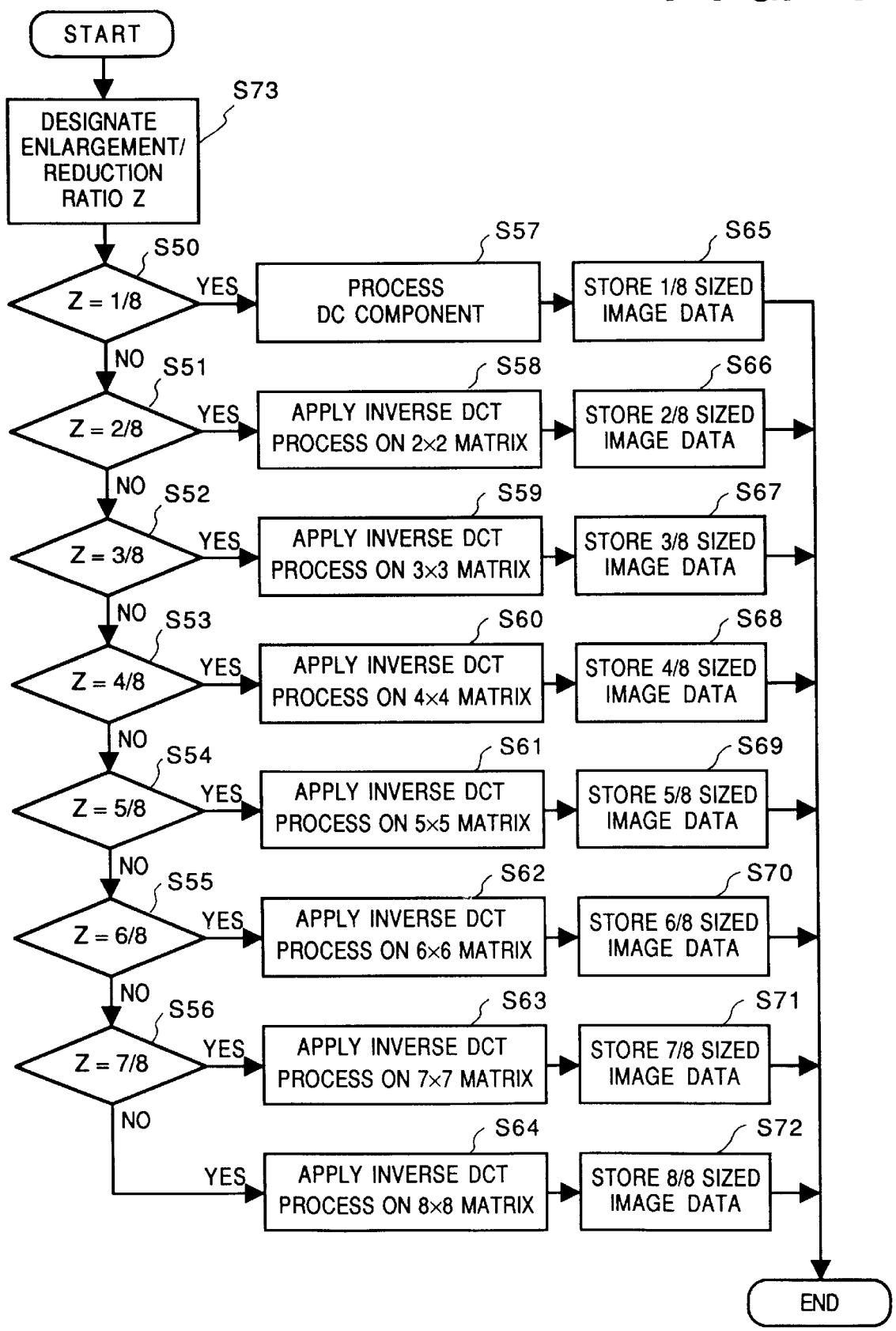
FIG. 7 is a flowchart illustrating inverse DCT process including enlargement/reduction process according to the first embodiment.

FIG. 7 is a flowchart explaining a process to reproduce image data from DCT coefficients decoded by the Huffman decoding unit 11 in FIG. 1 by performing the inverse DCT process, and to store the image data in the image memory B 13.

First, at step S73, the ratio designator 15 shown in FIG. 1 designates a ratio Z. Then, at steps S50 to S56, whether or not the ratio Z designated at step S73 is $1/8$, $2/8$, $3/8$, $4/8$, $5/8$, $6/8$, or $7/8$ is determined by the DCT matrix selector 16. For example, whether or not the ratio Z is $1/8$ is determined at step S50, and if so, the process moves to step S57 where a DC component is applied with the inverse DCT process. If the ratio Z is not $1/8$, then the process moves to step S51, and whether or not the ratio Z is $2/8$ is determined. Likewise, at step S56, whether or not the ratio Z is $7/8$ is determined, and if so, the process moves to step S63 where inverse DCT process is performed on a 7×7 DCT coefficient. If the ratio Z is not $7/8$, then the ratio Z is determined to be $8/8$ and the process proceeds to step S64 where an equal size inverse DCT process is performed.

At steps S57 to 64, the inverse DCT process is performed on a DC component, and AC components of a 2×2, 3×3, 4×4, 5×5, 6×6, 7×7, or 8×8 matrix of the DCT coefficients by the inverse DCT unit 12 shown in FIG. 1 in accordance with the determined result about the ratio Z at steps S50 to S56.

At step S57, for example, the inverse DCT process is performed only on a DC component of a DCT coefficient block, namely, on a 1×1 matrix, thereby generating $1/8 \times 1/8$ size image data. Then the process proceeds to step S65. Further, at step S58, the inverse DCT process is performed on a 2×2 matrix, thereby generating $2/8 \times 2/8$ size image data and the process moves to step S66. Likewise, the inverse DCT process is performed on a 3×3, 4×4, 5×5, 6×6, 7×7, or 8×8 matrix at each step of S59 to S64, respectively.

At steps S65 to S72, image data reduced to a $1/8 \times 1/8$, $2/8 \times 2/8$, $3/8 \times 3/8$, $4/8 \times 4/8$, $5/8 \times 5/8$, $6/8 \times 6/8$, $7/8 \times 7/8$, or $8/8$ size at steps S57 to S64, respectively, is stored in the image memory B 13.

As described above, an image is reduced during performing the inverse DCT process on the DCT coefficients according to the first embodiment.

Next, an example of a table held in the DCT matrix selector 16 in FIG. 1 is shown in FIG. 8.

As seen in FIG. 8, the DCT matrix selector 16 has a table whose components are "numbers of necessary DCT coefficients" and "sizes of matrixes to be applied with the inverse DCT process" for each of eight ratios Z from ⅛ to ⅝. Then the number of necessary DCT coefficients is converted to the ACend signal 17 and the size of a matrix to be applied with the inverse DCT process is converted to a DCT matrix signal 18, and signals are sent to the Huffman decoding unit 11 and the inverse DCT converter 12, respectively.

Note that "numbers of necessary DCT coefficients" correspond to the ordinal number of the DCT coefficients in FIG. 5.

According to the first embodiment as described above, it is possible to shorten the processing time for decoding process of DCT coded image data, especially decoding process with reduction operation.

<Second Embodiment>

Following is an explanation on the second embodiment of the present invention.

In the aforesaid first embodiment, Huffman decoding process is continuously operated until the end of a block (EOB) code indicating the end of a single block of coded data is detected or all 64 coded data are decoded.

In the second embodiment, when the least necessary AC components are determined during decoding process of AC components as described in the first embodiment, a pointer of the coded data is moved to the top of the next block, thereby omitting unnecessary Huffman decoding process and the processing time is reduced further.

Figure 9:
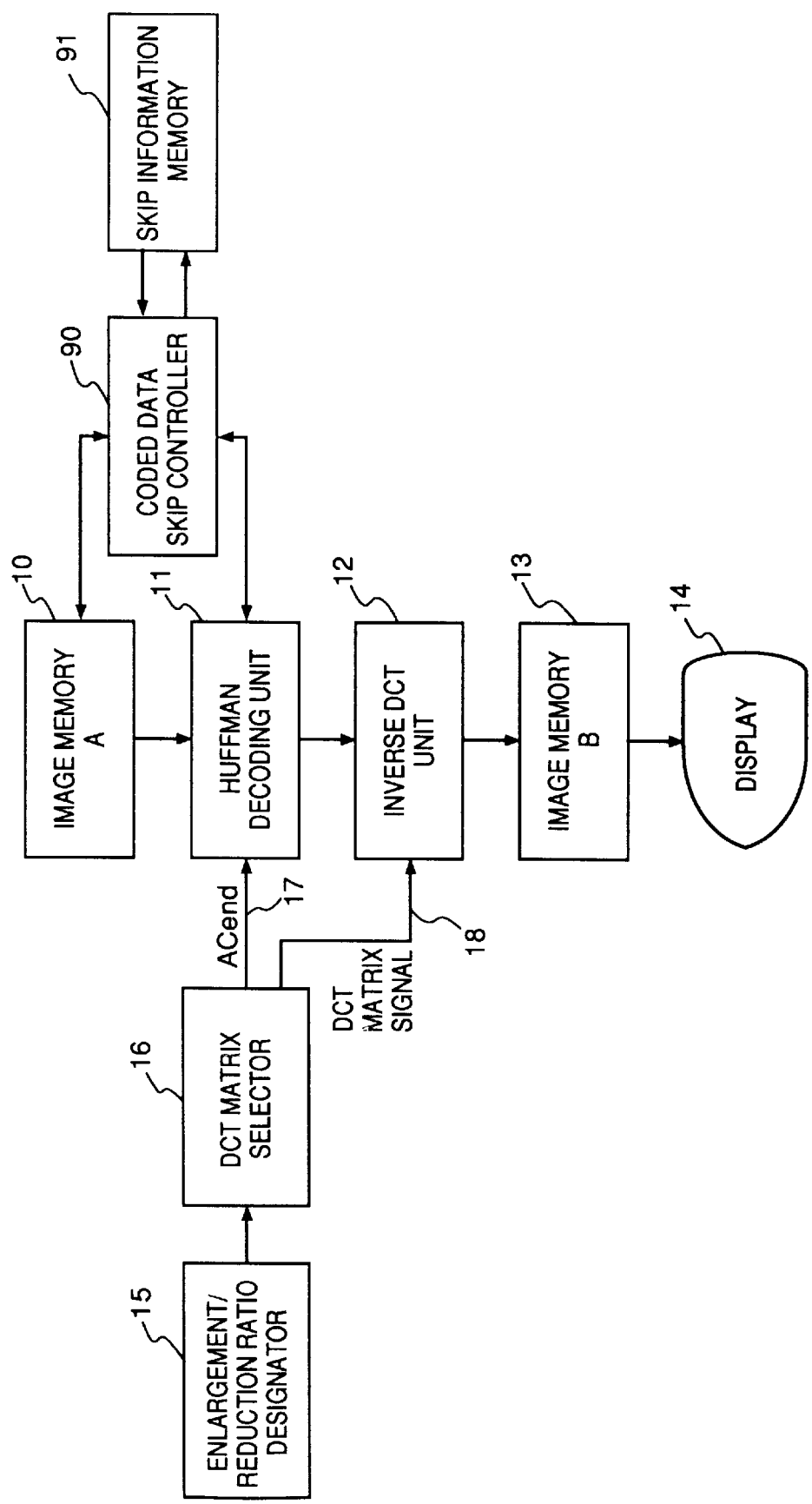
FIG. 9 is a block diagram illustrating a configuration of an image processing apparatus according to a second embodiment of the present invention.

FIG. 9 is a block diagram illustrating a configuration of coding and display process in an image processing apparatus according to the second embodiment. In FIG. 9, the elements which are the same or similar to the elements in FIG. 1 are referred by the same reference numerals as in FIG. 1, and the description of these elements are omitted.

In FIG. 9, reference numeral 90 denotes a coded data skip controller, and reference numeral 91 denotes a skip information memory. The coded data skip controller 90 instructs to move a coded data pointer stored in the image memory A 10 in accordance with a code length per block which is stored in the skip information memory 91 in advance, that will be described later, when a signal indicating that the least necessary DCT coefficients have been decoded from the Huffman decoding unit 11.

Figure 10:
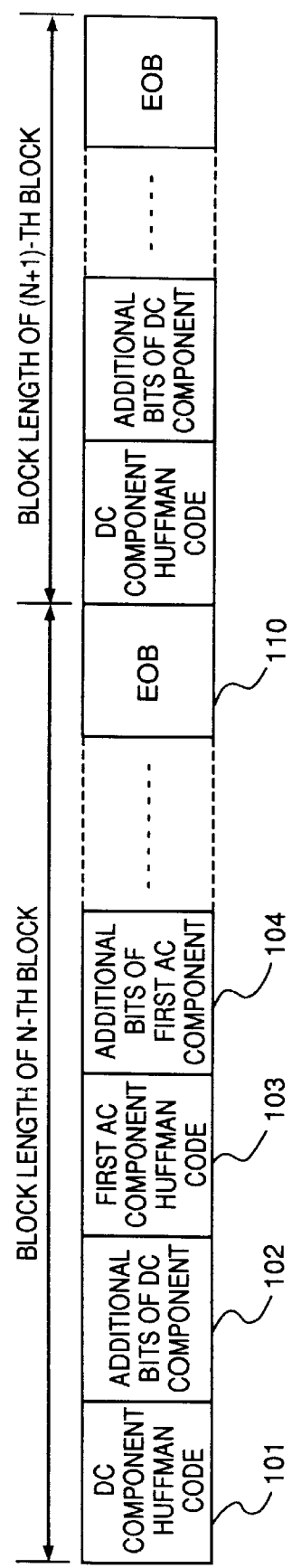
FIG. 10 shows a construction of coded data according to the second embodiment.

In FIG. 10, a construction of coded data of an image stored in the image memory A 10 is shown. For instance, coded data of the N-th block consists of a DC component 101 of Huffman code followed by a DC component additional bit 102, a first AC component 103 of Huffman code, and an additional bit 104 of the first AC component. In the coded data, a plurality of AC components and of additional bits of the AC components, where the maximum number is 63, can exist until the EOB code 110 is placed at the end of the block of coded data. In FIG. 10, a N-th block is consists of bits referred as 101 to 110 then a (N+1)-th block follows.

Length of the coded data can change since it is a Huffman code, further, the number of AC components in the coded data differs depending upon a block. Therefore, the block length of the N-th block and the block length of the (N+1)-th block differ from each other, thus it is not possible to predict a top position of the (N+1)-th block in the middle of decoding process of the N-block.

Therefore, in the second embodiment, block length of each block are checked in advance, and the difference between a block lengths of the current block and of the previous block is found, and the obtained difference is coded and stored in the skip information memory 91. And during performing of Huffman decoding, a block length of a single block is found on the basis of the coded data on the difference stored in the skip information memory 91, and a skip amount of the coded data stored in the image memory A 10 is controlled by the coded data skip controller 90.

Figure 11:
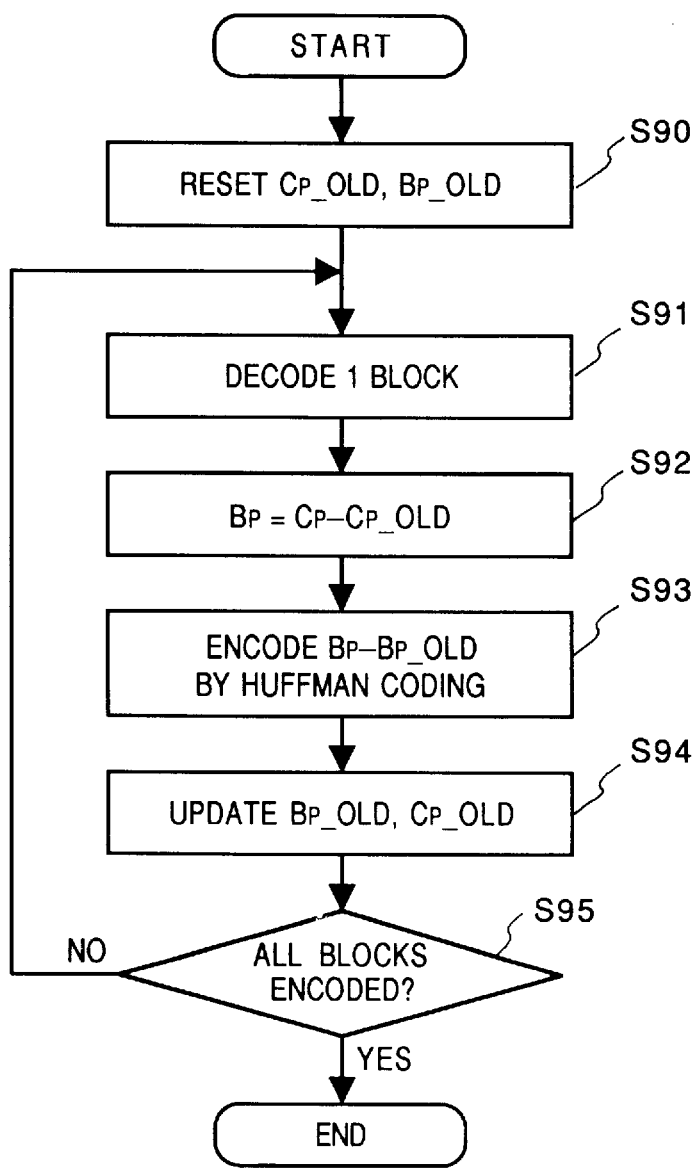
FIG. 11 is a flowchart explaining coding process by a block according to the second embodiment.

Next, a process to encode block lengths of each block which is to be stored in the aforesaid skip information memory 91 will be explained with reference to a flowchart in FIG. 11.

First, at step S90, position pointers of the previous block CP_OLD and a block length of the previous block BP_OLD are reset. Then, a current block is decoded at step S91. At step S92, a block length of the current block BP is obtained from the difference between a pointer of code position in the current block CP, and the pointer of position in the previous block CP_OLD. Then at step S93, the difference between the block length of the previous block BP_OLD and the block length of the current block BP is find, and the obtained difference is coded based on Huffman coding. At step S94, CP_OLD and BP_OLD are updated by being replaced by CP and BP, respectively. At step S95, whether or not all the differences between two succeeding blocks are encoded is determined, and if not, the process goes back to step S91 and the next block is processed.

As described above, block lengths to be stored in the skip information memory 91 are coded in the second embodiment. When the coded data is decoded, the coded differences in block lengths are decoded in the inverse process to the one shown in FIG. 11, and a skip amount while coded data is read can be determined by referring to the decoded differences in the second embodiment.

Figure 12:
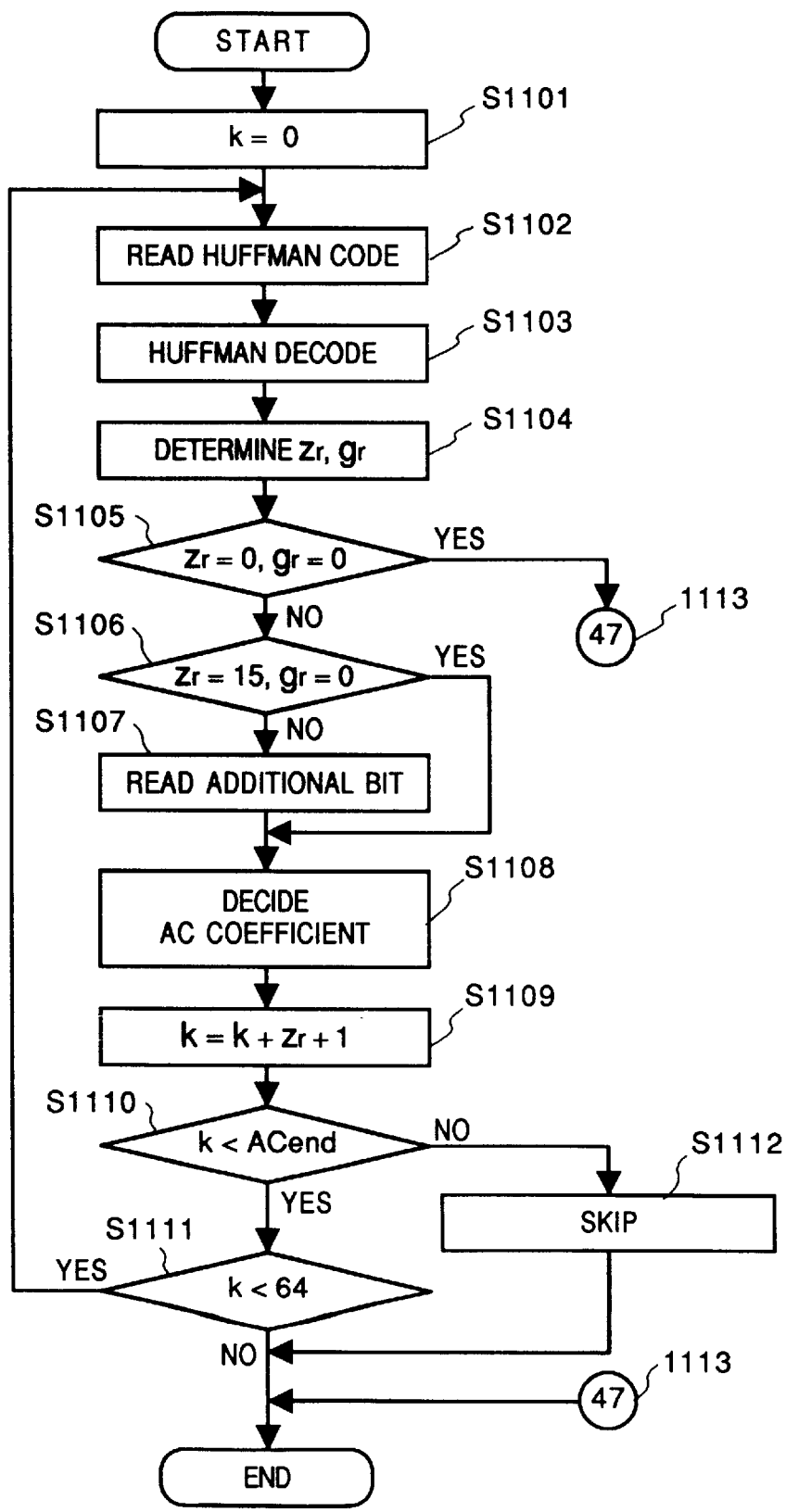
FIG. 12 is a flowchart explaining AC component decoding process by the Huffman decoding unit according to the second embodiment.

Next, referring to FIG. 12, decoding process of AC components of a block, which is a part of decoding process of the DCT coded data by the Huffman decoding unit 11 shown in FIG. 9 is explained.

First, at step S1101, a pointer k indicating the position of a last DCT coefficient decoded is initialized to "0", next at step S1102, the block of coded data is read in accordance with the pointer indicating the position of the coded data. At step S1103, first decoding of an AC component designated by the pointer k is performed by using a Huffman coding table (not shown) for AC components. At step S1104, the zero run length (zr) and the group number (gr) are determined from the first decoded value of the AC component obtained at step S1103 by using the Huffman coding table for AC components.

At step S1105, whether or not zr=0 and gr=0, in other words, if the AC component, designated by the pointer k, which is under decoding process indicates an end of a block code (EOB) is determined, and if so, the process is completed, whereas if not, the process proceeds to step S1106.

At step S1106, whether or not zr=15 and gr=0, in other words, the AC component, indicated by the pointer k, which is under decoding process is "0" and the run length (ZRL) indicates 15 (altogether make ZRL) is determined. If not ZRL, the process moves to step S1107, whereas, if ZRL, since an additional bit does not exist, step S1107 is skipped and the process proceeds to step S1108.

At step S1107, an additional bit is read. At step S1108, the AC component is determined from a grouping table for AC components (not shown), successively the position of the last DCT coefficient which has been already processed is updated by adding zr+1 to the pointer k at step S1109.

At step S1110, whether or not the pointer k indicating the position of the last DCT coefficient which has been processed is less than a necessary DCT coefficient number, ACend, which is a threshold, is checked. If the pointer k is less than the ACend, the process proceeds to step S1111, whereas, if the pointer k is greater or equal to the ACend, the process moves to step S1112.

At step S1112, a pointer indicating a position of a last coefficient which has been decoded is incremented until the pointer designates the top of the next block by referring to each block length information stored in the skip information memory 92 in FIG. 9, then the position of coded data to be read next is skipped thereby completing the process.

At step S1111, whether the pointer k indicating a position of the last coefficient which has been already processed is less than 64, a maximum value, is determined. In a case where the pointer k is greater or equal to 64, coding process is completed. Whereas, if the pointer k is less than 64, the process goes back to step S1102, and decoding process of the next AC component starts.

According to the decoding process of AC components in the second embodiment as described above, when necessary AC components have been decoded, the pointer indicates to skip the next block without processing the rest of AC components in the current block. Therefore, it is able to shorten a processing time of decoding process by omitting operations on unnecessary AC components.

According to the second embodiment as described above, it is possible to reduce processing time of decoding an DCT coded image further, especially decoding with reduction operation.

Furthermore, by obtaining information on each block length when an image is displayed for the first time by using the method described in the first embodiment, subsequently, when an image is displayed for the second time or after, it is possible to skip the unnecessary coded data by referring to block length information obtained in advance in the method according to the second embodiment. In short, by combining the first embodiment and the second embodiment, processing time of decoding coded data can be reduced more efficiently.

<Third Embodiment>

Following is an explanation of a third embodiment of the present invention.

In the aforesaid second embodiment, a process to skip unnecessary coded data by referring to the block length of the coded data was described. However, according to the second embodiment, block length information has to be recorded, maintained, and decoded, thus the process becomes complicated.

Therefore, in the third embodiment, filtering is performed on coded data in advance and the coded data is stored after the block is converted to a block of fixed length. By fixing the block length, when coded data is skipped, complicated processes such as recording, maintenance, and decoding of each block length information which are performed in the second embodiment, become unnecessary.

Figure 13:
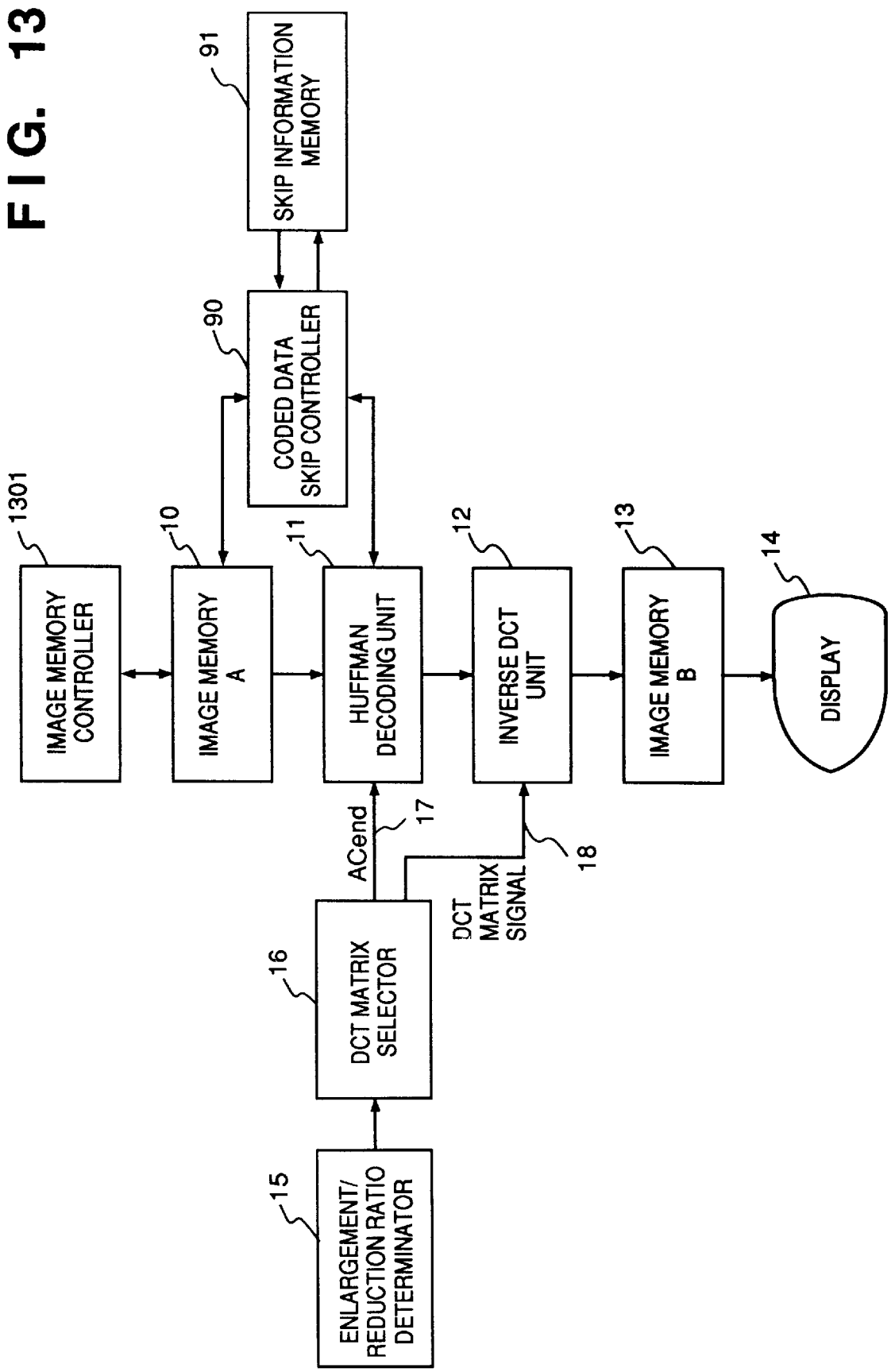
FIG. 13 is a block diagram illustrating a configuration of an image processing apparatus according to a third embodiment of the present invention.

FIG. 13 shows a block diagram illustrating an example of configuration of decoding/display unit in an image processing apparatus according to the third embodiment. In FIG. 13, the elements which are the same or similar to the consisting in FIG. 9 in the second embodiment are referred with the same reference numerals as in FIG. 9, and the description of these elements are omitted.

In FIG. 13, reference numeral 1301 denotes an image memory controller which filters coded data as described above.

Figure 14:
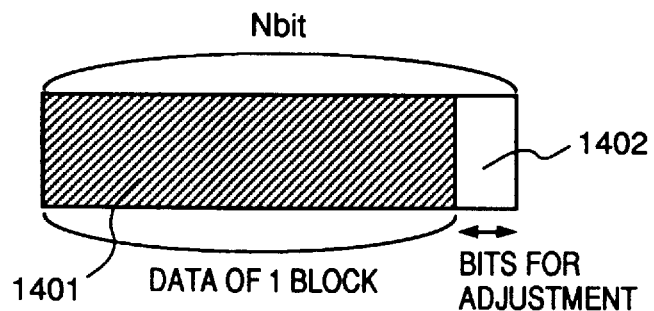
FIG. 14 shows a work area of fixed length during recording coded data according to the third embodiment.

FIG. 14 shows an example of a work area in a case where a single block of coded data is stored in fixed length according to the third embodiment. In the third embodiment, a fixed block length N which is smaller than a maximum block length of coded data and has a bit number of a multiple of 8 is decided in advance, and a block of coded data 1401 fills the work area of the fixed block length N from the top. Accordingly, the rest of the work area of the fixed block length N, 1402, becomes an area for adjustment, and contents to fill the area is not decided. Thus, by defining a code to indicate the beginning of an area for adjustment in advance, for instance, the area becomes invalid during decoding AC components by the Huffman decoding unit 11 in FIG. 13.

Figure 15:
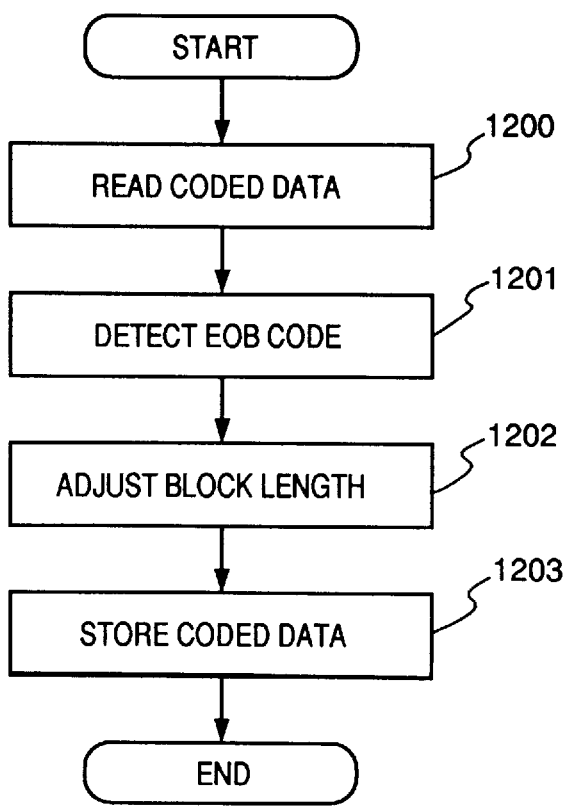
FIG. 15 is a flowchart illustrating process of adjusting coded data block length according to the third embodiment.

Referring to FIG. 15, a process by the image memory controller in FIG. 13 is described.

FIG. 15 is a flowchart illustrating a process in the image memory controller 1301 shown in FIG. 13.

First, at step S1200, coded data is read. Next, at step S1201, an EOB code indicating the end of a block of coded data is checked. Thereby a block of coded data is checked. Then at step S1202, a block length of coded data is adjusted by using the work area shown in FIG. 14. The coded data block which has its length adjusted so as to fit the fixed length is recorded in the image memory A 10 in FIG. 13. at step S1203.

According to the third embodiment as described above, processing time can be further shortened since it is easier to skip unnecessary coded data during decoding AC components by fixing the block length of coded data.

It should be noted that the skip information memory 91 in FIG. 13 is not always necessary in the third embodiment, however, it can be used to store information on fixed block length, for instance.

Note that the predetermined fixed block length of the third embodiment is preferably determined experimentally for each image processing apparatus, since the most suitable block length differs depending upon the compression ratio, configuration of memory, and so on, of the apparatus.

<Fourth Embodiment>

A fourth embodiment of the present invention will be described below.

In the fourth embodiment, decoding time is shortened by removing redundancy of a code which will be generated by an encoder.

In the Huffman coding method which is a standard method of DCT coding, when the zero run length exceeds 15, a ZRL code is used to represent sixteen zeros, and the ZRL code is repeatedly used until the zero run length becomes shorter than 15. An example where a plurality of ZRL codes are used in coded data is shown in FIG. 16A.

In a case where an encoder for DCT coding, especially a hardware encoder, is used, it is necessary to perform encoding process continuously. Therefore, as shown in FIG. 16A, the ZRL code is repeatedly used a plurality of time even though the DCT coefficients of a higher frequency are zero, then a code EOB follows.

In the fourth embodiment, in a case where the DCT coefficients of high frequency in a coded data block, for example, most of coefficients which are placed in relatively latter in FIG. 5, are zero, it is preferred to attach the EOB code after the last coefficient having some value other than zero (significant coefficient).

However, in a case where a plurality of ZRL codes are used by employing the standard Huffman coding method, the ZRL codes are also decoded during decoding process, which consumes some time.

Therefore, in the fourth embodiment, redundancy which is added while encoding image data is adjusted and the coded data is stored.

A construction of an apparatus in the fourth embodiment is similar to that shown in the third embodiment with reference to FIG. 13, however filtering process by the image memory controller 1301 in FIG. 13 differs.

Next, referring to FIG. 17, a process by the image memory controller 1301 in the fourth embodiment will be explained.

FIG. 17 is a flowchart illustrating a process by the image memory controller 1301 in FIG. 13 in the fourth embodiment.

First at step S1701, a coded data is read, then at step S1702, a ZRL code indicating zero run length of sixteen and an EOB code indicating the end of a block of coded data are detected. Next at step S1703, in only a case where at least a single ZRL code is followed by the EOB code, these codes are replaced by a single EOB code. Then, a coded data block in which the ZRL code, followed by the EOB code, is deleted is stored in the image memory A 10 in FIG. 13 at step S1704.

According to the fourth embodiment as described above, processing time for decoding is further shortened by storing coded data after deleting redundancy, produced while image data is encoded, since it is not necessary to perform decoding on unnecessary ZRL codes during decoding of AC components.

Further, it is possible to further reduce processing time for decoding by using one of the methods described in the first to fourth embodiments, or their combinations.

It should be noted that, in the aforesaid first to fourth embodiment, the final image output unit is a display according to the constitution of the image processing apparatus, however, the present invention is not limited to this, and any kinds of output apparatus can be used as long as the apparatus is able to output an image. For example, a printing unit, such as a printer, a transmission apparatus, such as a facsimile, or the like, can be used.

According to the first to fourth embodiments as described above, it is possible to display an image of the size of ⅛×⅛, ¼×¼, ½×½, or the like of an original image based on sequential coded data without using a memory of large capacity.

<Fifth Embodiment>

In the process to change sizes of an image as described in the aforesaid first to fourth embodiments, sizes of an image obtained by decoding coded data by employing the hierarchical coding method are predetermined sizes, such as ½×½ and ¼×¼ of an original image, which are decided during encoding process. Therefore, it is difficult to apply the hierarchical coding method when an original image needs to be changed to an image of an arbitrary size.

In the fifth embodiment, process to change sizes of data encoded by employing the hierarchical coding method without limiting enlargement/reduction ratios will be explained.

Figure 18:
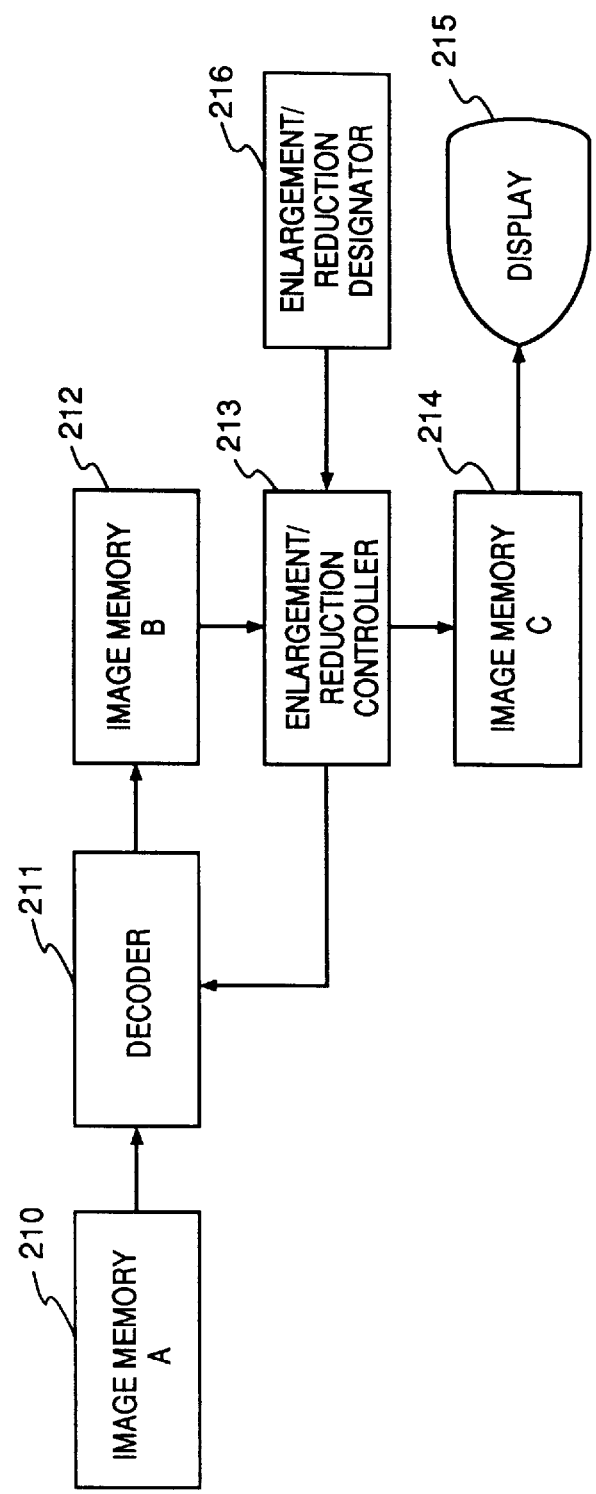
FIG. 18 is a block diagram showing a configuration of an image processing apparatus according to a fifth embodiment of the present invention.

FIG. 18 is a block diagram illustrating a constitution of a unit, performing decoding and display, of an image processing apparatus according to the fifth embodiment of the present invention.

In FIG. 18, reference numeral 210 denotes an image memory A which stores DCT coded data, more particularly, by ADCT defined in JPEG. The coded data is sent from the image memory A 210 to a decoder 211 where the coded data is decoded in accordance with a DCT matrix which is outputted from an enlargement/reduction controller 213 (referred as "controller 213", hereinafter) that will be described later. The decoded data is stored in an image memory B 212. The controller 213 outputs the DCT matrix to the decoder 211 in accordance with an enlargement/reduction ratio Z (referred as "ratio Z", hereinafter) which is designated by an enlargement/reduction ratio designator 216 (referred as "ratio designator", hereinafter). Further the controller 213 changes sizes of the decoded image data stored in the image memory B 212 by using known methods, such as a sub-sampling and interpolation method, and the processed image data is stored in an image memory C 214. The image data stored in the image memory C 214 is displayed on a display 215, such as a monitor.

Note that the display 215 can be replaced by any device, such as a printing device, as long as it is possible to output image data representing an image whose size is changed.

Figure 19:
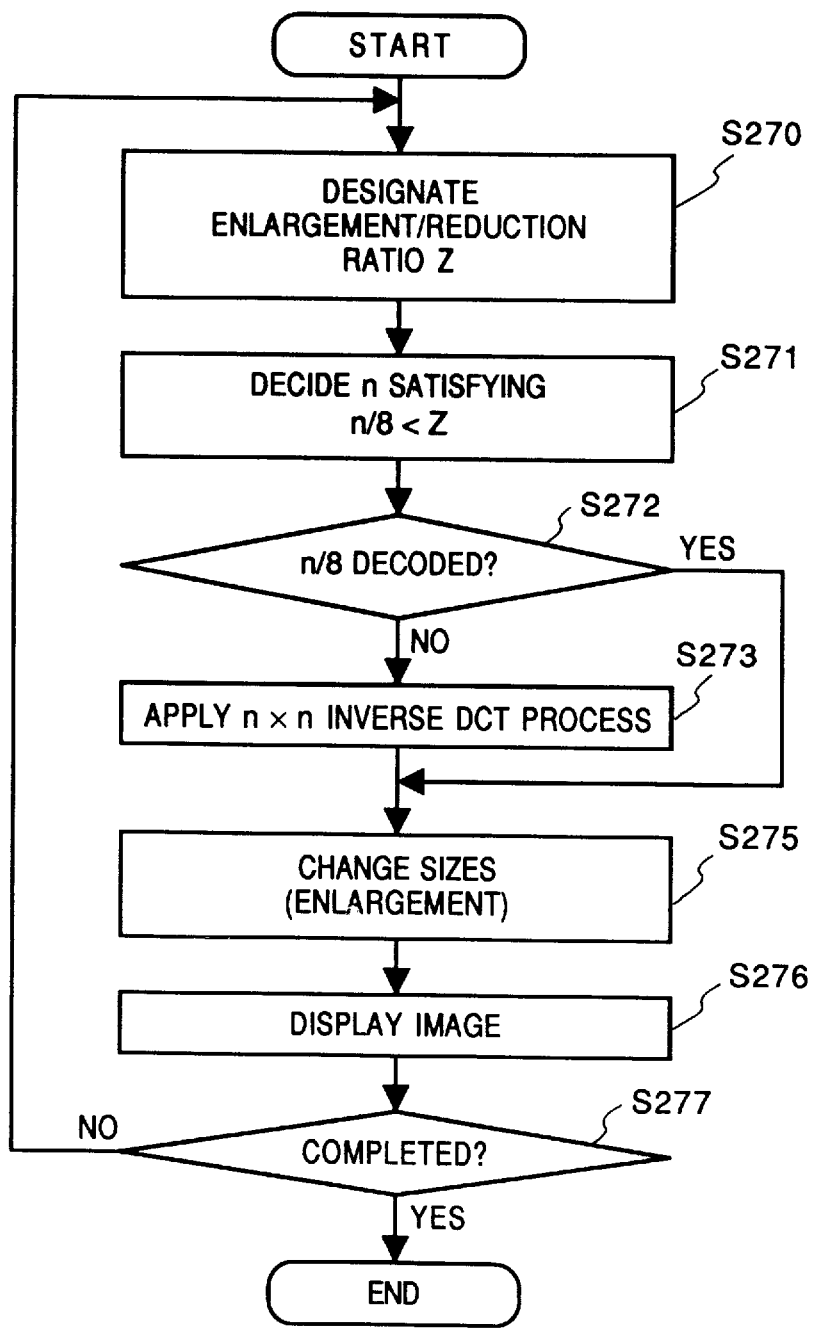
FIG. 19 is a flowchart illustrating enlargement/reduction and displaying process according to the fifth embodiment.

Next, referring to a flowchart in FIG. 19, there is described a process to display an image whose size is changed in the image processing apparatus in FIG. 18 according to the fifth embodiment.

According to the process to change sizes of an image in the fifth embodiment, a proper hierarchy of coded data encoded by using the hierarchical coding method is decoded, then corrected in accordance with to the designated enlargement/reduction ratio.

In FIG. 19, at step S270, the ratio Z is designated by the ratio designator 216 shown in FIG. 18, then at step S271, the hierarchy of the hierarchy coding method is decided based on the ratio Z at the controller 213. In the fifth embodiment, the maximum n (n<8; n is a positive integer) is decided so that n/8 does not exceeds the ratio Z as a hierarchy of the hierarchical coding method. Next at step S272, whether or not decoding of image data to the size of n/8×n/8 has been already completed is checked by determining whether or not any decoded data exists in the image memory B 212, for instance. With the determination at step S272, image data which has already been decoded is not applied with another decoding process, and can be changed to a size corresponding to a enlargement/reduction ratio between n/8 and (n+1)/8.

If image data is determined to have been decoded already at step S272, the process proceeds to step S275, while if not, the process moves to step S273.

At step S273, n/8×n/8 size decoded data is generated by using inverse transfer using a n×n matrix in the decoder 211, and outputted to an image memory B 212. Then, at step S275, known enlargement method, such as interpolation processing, is applied to the decoded n/8×n/8 size image stored in the image memory B 212 in the controller 213, so that the reduced size is changed to a size designated by the ratio Z at step S270, and the processed image data is outputted to the image memory C 214. Then, at step S276, the image data is displayed on the display 215. At step S277, completion of displaying an image whose size is changed is checked. For instance, at step S277, in a case where it is unnecessary to continue the process to change sizes, the entire process is terminated, whereas in a case where a different enlargement/reduction ratio is to be newly designated, the process goes back to step S270, and the new ratio is designated.

Note that display process at step S276 can be other process, such as printing process by a printer, as long as an image whose size is changed can be outputted.

Further, it should be noted that, in the fifth embodiment, n is decided so that it satisfies a n/8<Z condition at step S271 in FIG. 19, therefore, the possible value of n is limited to the range between 1 and 8. Thus, the range which the ratio Z can take is limited to 1/8<Z, and it is not possible to reduce an image to a size smaller than 1/8.

In the fifth embodiment, decoding process to decode the DC component of hierarchically coded (DCT) data by the decoder 211 shown in FIG. 18 is the same as the process described in the aforesaid first embodiment with reference to FIG. 2, thus the explanation of the process is omitted.

Figure 20:
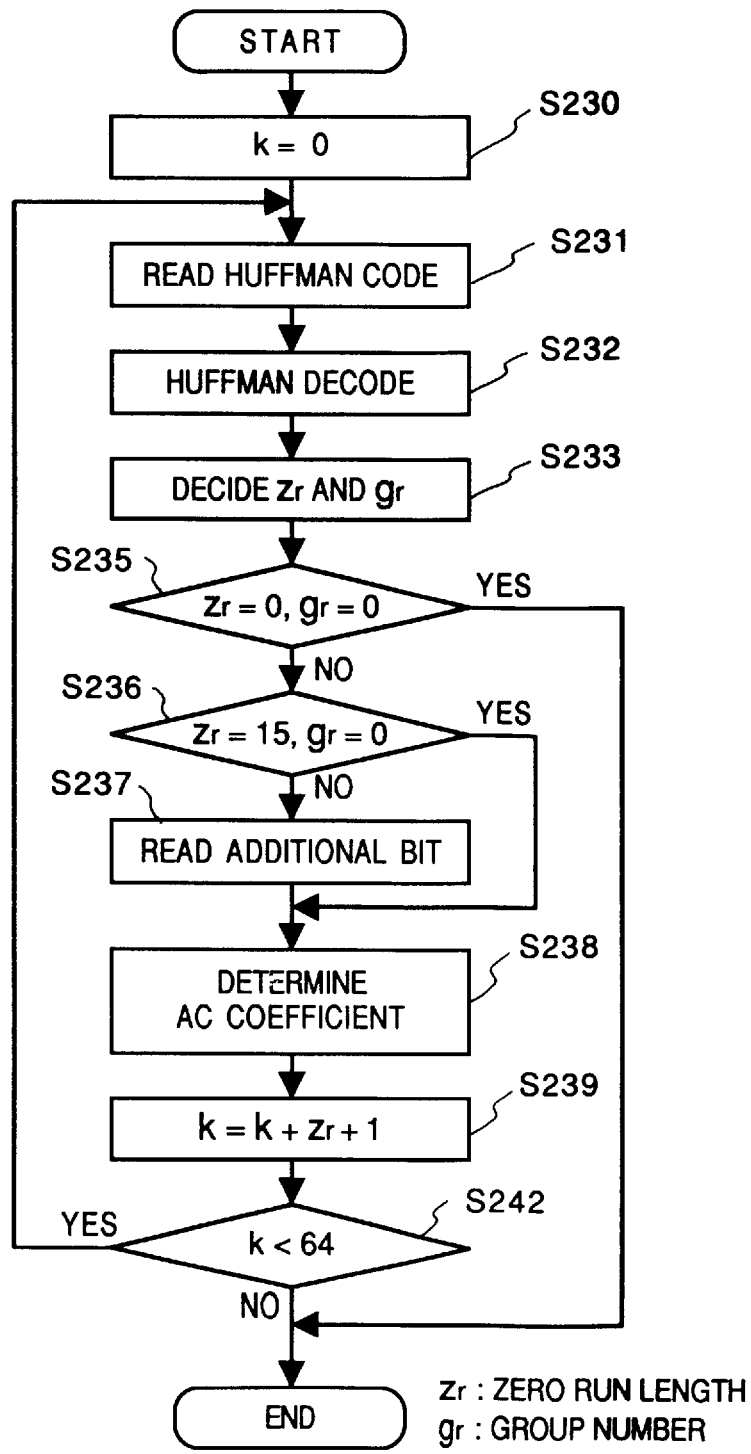
FIG. 20 is a flowchart illustrating AC component decoding process according to the fifth embodiment.

FIG. 20 is a flowchart illustrating decoding process of AC components of the decoding process of the DCT coded data by the decoder 211 shown in FIG. 18.

First, at step S230, a pointer k indicating a position of a decoded DCT coefficient is reset. Next at step S231, a coded data block is read, and at step S232, a first decoding process is applied on an AC component which is designated by the pointer k by using a Huffman table for AC components (not shown). At step S233, a zero run length (referred as "zr") and a group number (referred as "gr") are determined by using the Huffman table for AC components from the first decoded value of the AC component obtained at step S232.

At step S235, whether or not zr=0 and gr=0, in other words, whether or not the AC component, indicated by the pointer k, which is under the decoding process indicates an end of block (EOB) code is determined. If EOB, the process is completed.

Whereas, if the AC component is not the EOB code at step S235, the process moves to step S236. At step S236, whether or not zr=15 and gr=0, namely, whether or not the AC component, indicated by the pointer k, which is under the decoding process is "0" and the run length indicates 15 (altogether make ZRL) are determined. If not ZRL, then process moves to step S237, whereas, if ZRL, since there is not exists an additional bit, step S237 is skipped and the process moves to step S238.

At step S237, additional bits are read. At step S238, AC components are determined in accordance with a grouping table for AC components (not shown). Next at step S239, by adding zr+1 to the pointer k, data on a position of a last DCT coefficient which has been already processed is updated. Then the process proceeds to step S242 where whether or not the pointer indicating the last DCT coefficient which has been already processed is less than 64 is checked. If not, the decoding of the block is completed.

On the contrary, if the pointer k is less than 64, the process goes back to step S231, and decoding process of a next AC component starts.

As described above, the decoding process of AC components in the fifth embodiment is performed.

Note that the decoding by the decoder 211 shown in FIG. 18 includes reduction of a size of an image during applying the inverse DCT process on the DCT coefficients, as in the case described in the first embodiment with reference to FIGS. 5 to 7.

Next, a table stored in the controller 213 shown in FIG. 18 will be explained. The table is almost identical to the table in FIG. 8 in the aforesaid first embodiment beside a column, "numbers of necessary AC components", which is not included in the table stored in the controller 213. Therefore, each ratio Z from 1/8 to 8/8, designated by the ratio designator 216 corresponds to each of the size of the matrix subjected to inverse DCT process. Then the controller 213 outputs a matrix to be used for an inverse DCT process to the decoder 211. The decoder 211 find DCT coefficients of coded data to be decoded by referring the DCT matrix outputted from the controller 213.

According to the fifth embodiment as described above, in the process to change sizes of an image in accordance with an arbitrary enlargement/reduction ratio beside a fixed sizes determined during decoding image data by using the hierarchical coding method, such as the DCT coding method, especially in a case where the size of the image is reduced, the processing time is shortened without using a memory of a large capacity.

<Sixth Embodiment>

A sixth embodiment of the present invention will be described below.

In the above-described fifth embodiment, the process to change the sizes of the image represented by decoded data at step S275 in FIG. 19 is enlargement process, thus quality of the image may be deteriorated, which may cause blur, or the like, in the image. Therefore, in the sixth embodiment, a method to decide a hierarchy n in the hierarchical coding method is changed so that decoded data is applied with reduction process.

A constitution of an image processing apparatus in the sixth embodiment is the same as the one in FIG. 18 in the fifth embodiment.

Referring to a flowchart in FIG. 21, process of changing sizes and displaying an image by using the image processing apparatus according to the sixth embodiment will be described below.

Figure 21:
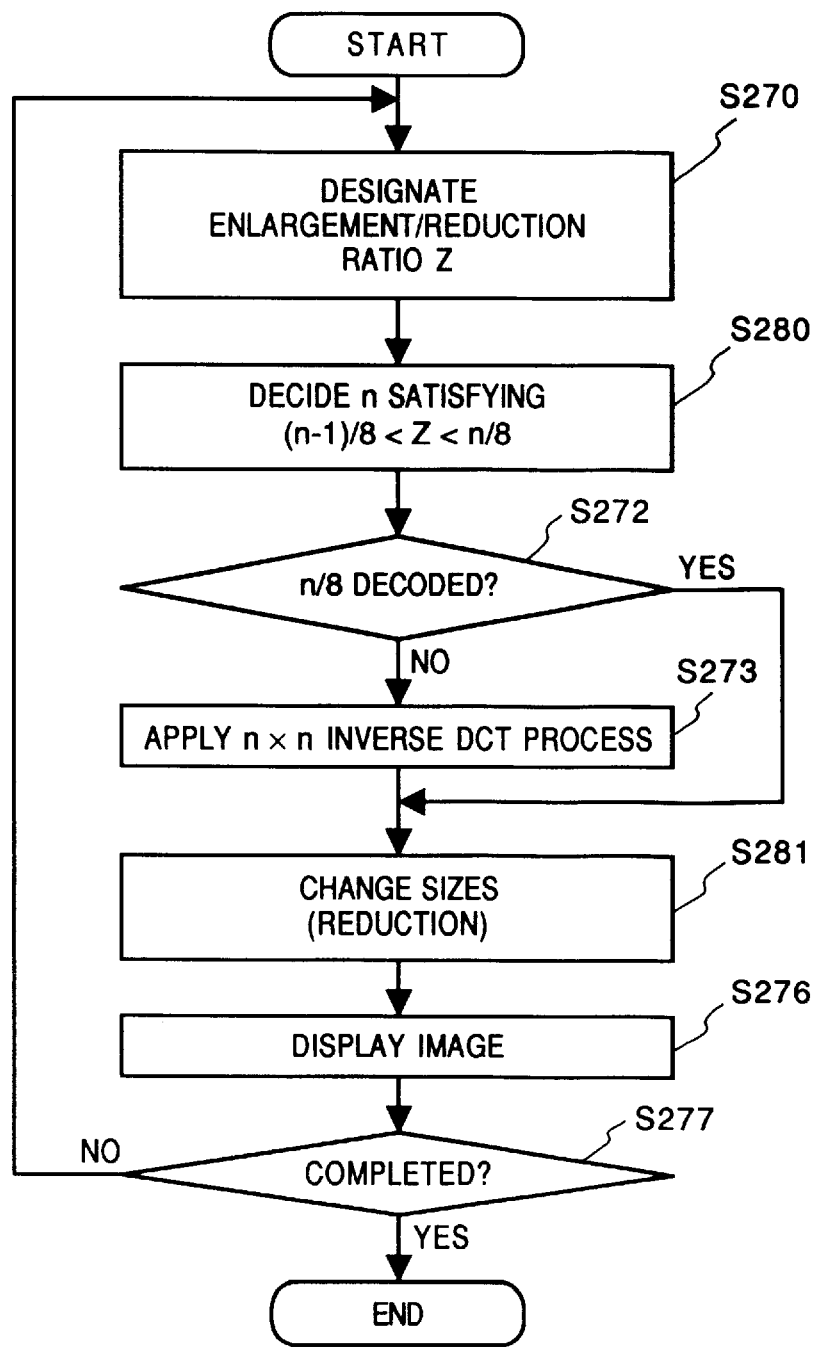
FIG. 21 is a flowchart illustrating enlargement/reduction display process according to a sixth embodiment of the present invention.

In FIG. 21, the same processes as in the flowchart in FIG. 19 have the same reference numerals, and the explanations on them are omitted.

In FIG. 21, at step S280, a hierarchy of the hierarchical coding method corresponding to the ratio Z is determined at the controller 213. In the sixth embodiment, as a hierarchy of the hierarchical coding method, n (n<8; n is a positive integer), satisfying a condition (n−1)/8<Z<n/8, is decided. Accordingly, image data is decoded to image data representing a n/8×n/8 size image by the decoder 211, thus the decoding process is performed to change sizes of an image corresponding to one size larger than the designated ratio Z in the sixth embodiment.

Then, at step S281, the reduced n/8×n/8 size decoded image, stored in the image memory B 212, is applied with reduction process, such as known sub-sampling or the like in the controller 213, so that the size of the image corresponds to the ratio Z designated at step S270. The processed image data is outputted to the image memory C 214. Accordingly, high frequency components of the image can be maintained, thus a reduced image of high quality can be obtained.

It should be noted that, in the sixth embodiment, n, satisfying the condition (n−1)/8<Z<n/8 is decided, and, since the value which n can take is in a range between 1 and 8, the range which the ratio Z can take is limited to a range 0<Z<1. Therefore, it is not possible to change sizes corresponding the ratio Z>1, namely enlarging process.

According to the sixth embodiment as described above, in process to change sizes of an image represented by image data which is encoded by the hierarchical coding method, such as DCT coding, in accordance with an arbitrary ratio beside fixed sizes, more particularly in reduction process, an image can be reproduced in high quality.

<Seventh Embodiment>

A seventh embodiment of the present invention will be described below.

In the aforesaid sixth embodiment, since the process, at step S281 in FIG. 21, of changing sizes of an image represented by decoded image data is limited to reduction process, it is not possible to perform enlargement process in which the ratio Z is greater or equal to 1. Further, although the ratio Z has a value which is closer to (n−1)/8, an image has to be reduced to a n/8×n/8 size at first, then reduced to proper size, thus the process tends to contain redundant processes.

Therefore, in the seventh embodiment, decoding process is performed by using both a hierarchy (n−1) of the hierarchical coding method and subsequent enlargement and a hierarchy n and a subsequent reduction, and decoded data of two different sizes is used so that the process of changing sizes of an image after decoding image data representing the image can be either reduction or enlargement process.

A constitution of an image processing apparatus according to the seventh embodiment is almost the same as the one in FIG. 18 described in the fifth embodiment, however, the image memory B 212 in the seventh embodiment requires larger capacity.

FIG. 22 shows an example of an enlargement/reduction ratio table referred when a hierarchy n of the hierarchical coding method is decided.

The enlargement/reduction ratio table shown in FIG. 22 is stored in the controller 213 in FIG. 18. The table shows the process of changing sizes in accordance with the ratio Z designated by the ratio designator 216, and indicates to which size, represented by n/8 (n≦8, n is a positive integer), the size of an image is changed at first, then indicates whether the image is to be reduced or enlarged, where the process differs depending on the ratio Z distinguished by every 1/16. For example, if Z=0.66, then the ratio Z is in between "5/8<Z<11/16" in the tenth row of the table shown in FIG. 22, thus the processing order of the changing size is "to enlarge from 5/8".

In the seventh embodiment, in this case, the coded data which is decoded into the size of 5/8 (0.625) is enlarged so that the size of the image corresponds to the ratio Z=0.66.

Note that, in the enlargement/reduction ratio table in FIG. 22, the range which the ratio Z can take is between 0<Z. Accordingly, it is possible to perform process of changing size in accordance with an arbitrary enlargement/reduction ratio.

Further, the enlargement/reduction ratio table is not limited to the one shown in FIG. 22, but can be set so as to draw the ability of a processing apparatus to the maximum.

Referring to a flowchart in FIG. 23, process of changing sizes and displaying an image in the seventh embodiment will be described below.

Figure 23:
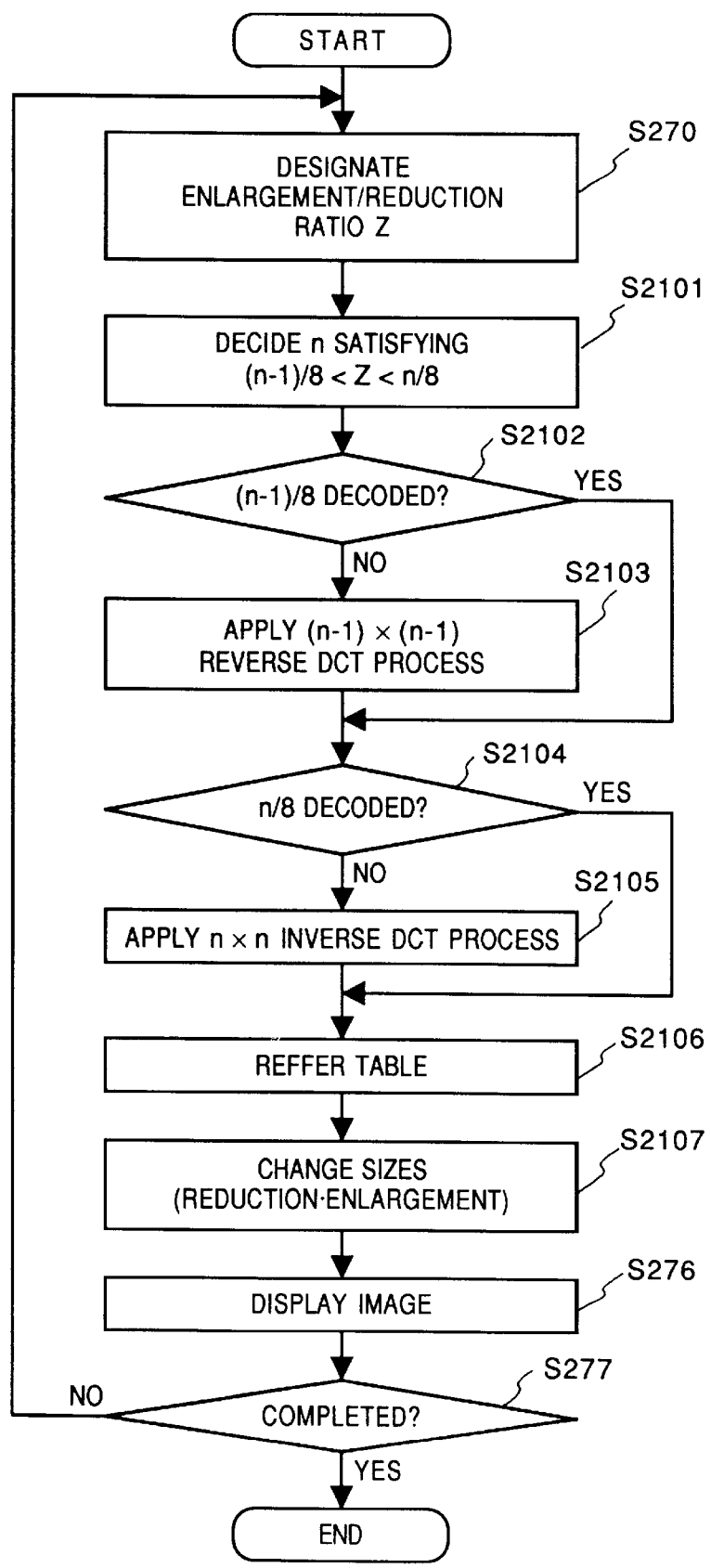
FIG. 23 is a flowchart illustrating enlargement/reduction display process according to the seventh embodiment.

In FIG. 23, the same processes as in the flowchart in FIG. 19 in the fifth embodiment have the same reference numerals, and the description of them are omitted.

In FIG. 23, a hierarchy of the hierarchical coding method corresponding to the ratio Z is determined by the controller 213 at step S2101. In the seventh embodiment, as the hierarchy of the hierarchical coding method, n (n<8; n is a positive integer), satisfying a condition (n−1)/8<Z<n/8, is decided. Next, at step S2102, whether or not (n−1)/8 size decoded data exists is checked by, for example, checking whether or not (n−1)/8 size decoded data exists in the image memory B 212. At step S 2102, if image data is decoded to the (n−1)/8 size, the process moves to step S2104, whereas if not, the process proceeds to step S2103. At step S2103, (n−1)/8 size decoded data is generated by inverse DCT process using a (n−1)×(n−1) matrix in the decoder 211, and outputted to the image memory B 212.

Next, at step S2104, whether or not n/8×n/8 size decoded data exist is checked by, for example, checking whether or not n/8×n/8 size decoded data exists in the image memory B 212. At step S2104, if the image data is decoded to the n/8×n/8 size, the process moves to step S2106, whereas if not, the process proceeds to step S2105. At step S2105, n/8×n/8 size decoded data is generated by inverse DCT process using a n×n matrix in the decoder 211, and outputted to the image memory B 212.

At step S2106, by referring the enlargement/reduction designation table shown in FIG. 22, it is decided whether reduction process is applied to the decoded n/8×n/8 size image data or enlargement process is applied to the decoded (n−1)/8×(n−1)/8 image data, then the decided decoded image data is stored in the image memory B 212. At step S2107, by following the processing order decided at step S2106, reduction or enlargement process, such as known sub-sampling and interpolation process, is applied on image data by the controller 213 so that the changed size corresponds to the ratio Z designated at step S270. The processed image data is outputted to the image memory C 214.

According to the seventh embodiment as described above, in reduction and enlargement processes corresponding to an arbitrary enlargement/reduction ratio beside fixed ratio during decoding process of image data encoded by the hierarchical coding method, such as the DCT coding method, the processing time is reduced as well as quality of the reproduced image is improved without using a memory of large capacity.

<Eighth Embodiment>

An eighth embodiment of the present invention will be described below.

In the aforesaid seventh embodiment, since decoded data of two different sizes have to be stored in the image memory B 212, the image memory B 212 requires large capacity, and redundant processes, such as decoding image data into two kinds of image data of two different sizes, are included.

Therefore, in the eighth embodiment, the number of image data to be decoded is one.

In the seventh embodiment, decoded data to be used is determined from the (n−1)/8×(n−1)/8 size decoded data and the n/8×n/8 size decoded data by referring to the enlargement reduction designation table at step S2106. Thus, by adding a decision process which decide which decoded data out of two kinds of decoded data before step S2102 and by performing determination at step S2102 and S2104 on the basis of the decided result of added decision process, the size of the image to which image data is decoded is reduced to one size.

In such method, it is necessary to decide the content of the enlargement/reduction designation table in FIG. 22 corresponding to a hierarchy n, decided at step S2101 in FIG. 23, of the hierarchical coding method, however, there is no parameters obviously corresponding to "n" in the content of the enlargement/reduction designation table in FIG. 22.

Therefore, in the eighth embodiment, a process to decide a hierarchy n of the hierarchical coding method in accordance with the enlargement/reduction designation table in FIG. 22 is explained as an example.

A structure of an image processing apparatus according to the eighth embodiment is the same as the one shown in FIG. 18 in the aforesaid fifth embodiment.

Process of changing size and displaying an image using the enlargement/reduction designation table in FIG. 22 in the eighth embodiment will be explained with reference to a flowchart in FIG. 24.

Figure 24:
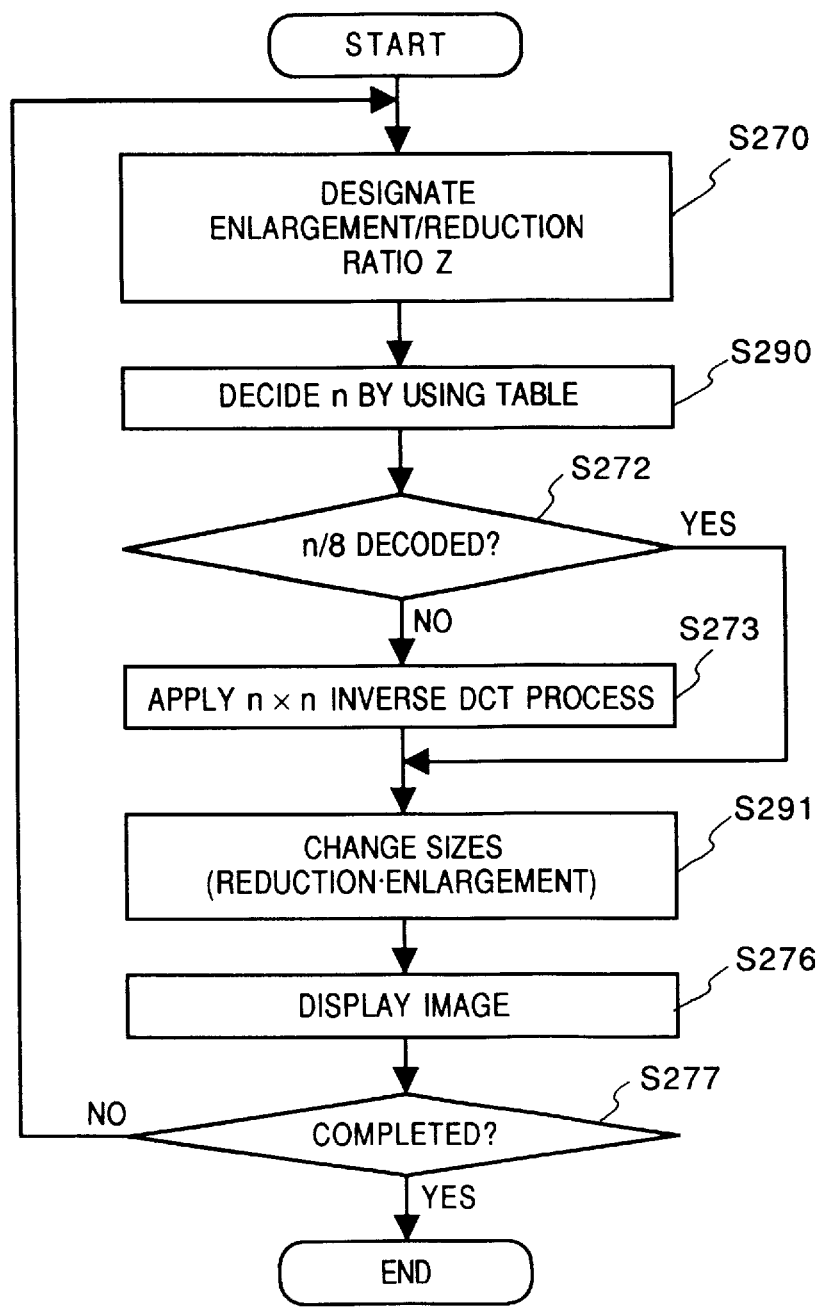
FIG. 24 is a flowchart illustrating enlargement/reduction and displaying process according to an eighth embodiment of the present invention.

In FIG. 24, the same processes as in the flowchart in FIG. 19 in the fifth embodiment have the same reference numerals, and the explanation of them is omitted.

In FIG. 24, a hierarchy n of the hierarchical coding method is decided by taking a numerator of a fraction in a row where the ratio Z belongs in a column of "designation of process" in the enlargement/reduction designation table in FIG. 22. The steps S273 and S274, following step S290, is the same as described with reference to FIG. 19 in the fifth embodiment, namely, image data is decoded to a n/8×n/8 size.

At step S291, the reduced n/8×n/8 size decoded image data, stored in the image memory B 212 is applied with reduction or enlargement process, such as known sub-sampling and interpolation process, by the controller 213 in accordance with designated contents in the enlargement/reduction designation table referred at step S290, so that the reduced size becomes the same as the ratio Z designated at step S290. The processed image data is outputted to the image memory C 214.

According to the eighth embodiment as described above, in reduction and enlargement process according to an arbitrary size beside fixed size during decoding of image data coded by the hierarchical coding method, such as the DCT coding method, the processing time is further shortened and the quality of the reproduced image is further improved.

The aforesaid process can draw the same or similar effects when the process of decoding and changing sizes is performed by using software.

According to the fifth to eighth embodiments as described above, it is possible to perform arbitrary sized and high-speed reduction and enlargement processes when the hierarchical coding method is utilized without using a memory of large capacity.

Further, in the first to eighth embodiments, reduction and enlargement processes by utilizing the DCT coding method are explained, however the present invention is not limited to this, and any coding method can be used as far as the method performs coding of variable length after performing space frequency conversion by a block size.

<Ninth Embodiment>

A process of generating hierarchically coded data in the above embodiment will be described below.

FIG. 25 is a block diagram of a constitution of a hierarchical processing unit which converts sequential coded data into hierarchical coded data in an image processing apparatus in a ninth embodiment.

In FIG. 25, coded data converted to DCT sequential coded data, especially coded data converted by an ADCT method defined in JPEG, is inputted by an input unit 311, such as a communication line. At decoding/inverse-quantizing unit 312, the inputted DCT sequential coded data is processed with Huffman coding and inverse-quantizing to reproduce a 8×8 DCT coefficient matrix. Then the obtained 8×8 DCT coefficient matrix is stored in a DCT coefficient memory A 313.

The DCT coefficients stored in the DCT coefficient memory A 313 are inputted to a DC component selector 314, a 2×2 selector 315, a 4×4 selector 316, and an 8×8 selector 317. In the DC component selector 314, the DC component is extracted from the inputted DCT coefficients, and quantized and coded by a DPCM encoding unit 318, then stored in a hierarchical code memory 322. It should be noted that the hierarchical code memory 322 can be a semi-conductor memory or a secondary memory, such as a hard disk, and the required capacity of the memory is much smaller than capacity of a memory for storing entirely decoded input data as pixel image data.

In the 2×2 selector 315, a 2×2 coefficient matrix is selected out of the 8×8 DCT coefficient matrix inputted from the DCT coefficient memory A 313, and after quantized and Huffman encoded by an AC encoding unit A 319, stored in a hierarchical code memory 322. In short, ¼×¼ size coded data is generated.

The 4×4 selector 316 selects a 4×4 coefficient matrix out of the 8×8 DCT coefficient matrix inputted from the DCT coefficient memory A 313, and after quantized and Huffman encoded by an AC encoding unit B 320, the obtained data is stored in a hierarchical code memory 322. Namely, ½×½ size coded data is generated.

At the 8×8 selector 317, a 8×8 coefficient matrix is selected out of the 8×8 DCT coefficient matrix inputted from the DCT coefficient memory A 313, and after quantized and Huffman encoded by an AC encoding unit C 321, stored in the hierarchical code memory 322. Therefore, the entire size coded data is generated.

Next, referring to FIGS. 26A to 26E, zigzag scanning, which is a method of selecting DCT coefficients at each DCT coefficient selector, such as the DC component selector 314 to the 8×8 selector 317, will be explained.

FIG. 26A shows an ordinary order to zigzag-scan 8×8 DCT coefficients. Further, FIG. 26B shows a position of a DC component of the 8×8 DCT coefficients. In the ninth embodiment, a DC component is extracted by the DC component selector 314 in FIG. 25 to form a ⅛×⅛ size image, and quantized and encoded by the DPCM encoding unit 318.

Further, FIG. 26C shows an order of 2×2 zigzag scanning out of the 8×8 DCT coefficients at the AC encoding unit A 319 in FIG. 25, and three coefficients excluding the DC component and the previously encoded DCT coefficients are Huffman encoded in the shown order. FIG. 26D shows an order of 4×4 zigzag scanning out of the 8×8 DCT coefficients at the AC encoding unit B 320 in FIG. 25, and twelve coefficients excluding the DC component are Huffman encoded in the shown order.

Furthermore, FIG. 26E shows an order of 8×8 zigzag scanning out of the 8×8 DCT coefficients at the AC encoding unit C 321 in FIG. 25, and forty-eight coefficients excluding the DC component and the fifteen previously encoded DCT coefficients are Huffman encoded in the shown order.

As described above, it becomes possible to convert sequential coded data into hierarchical data of four hierarchies, and store the hierarchical data in the hierarchical code memory 322 in the ninth embodiment.

Next, referring to FIG. 27, an image output process of displaying hierarchical coded data stored in the hierarchical code memory 322 in FIG. 25 on a monitor and the like will be explained.

Figure 27:
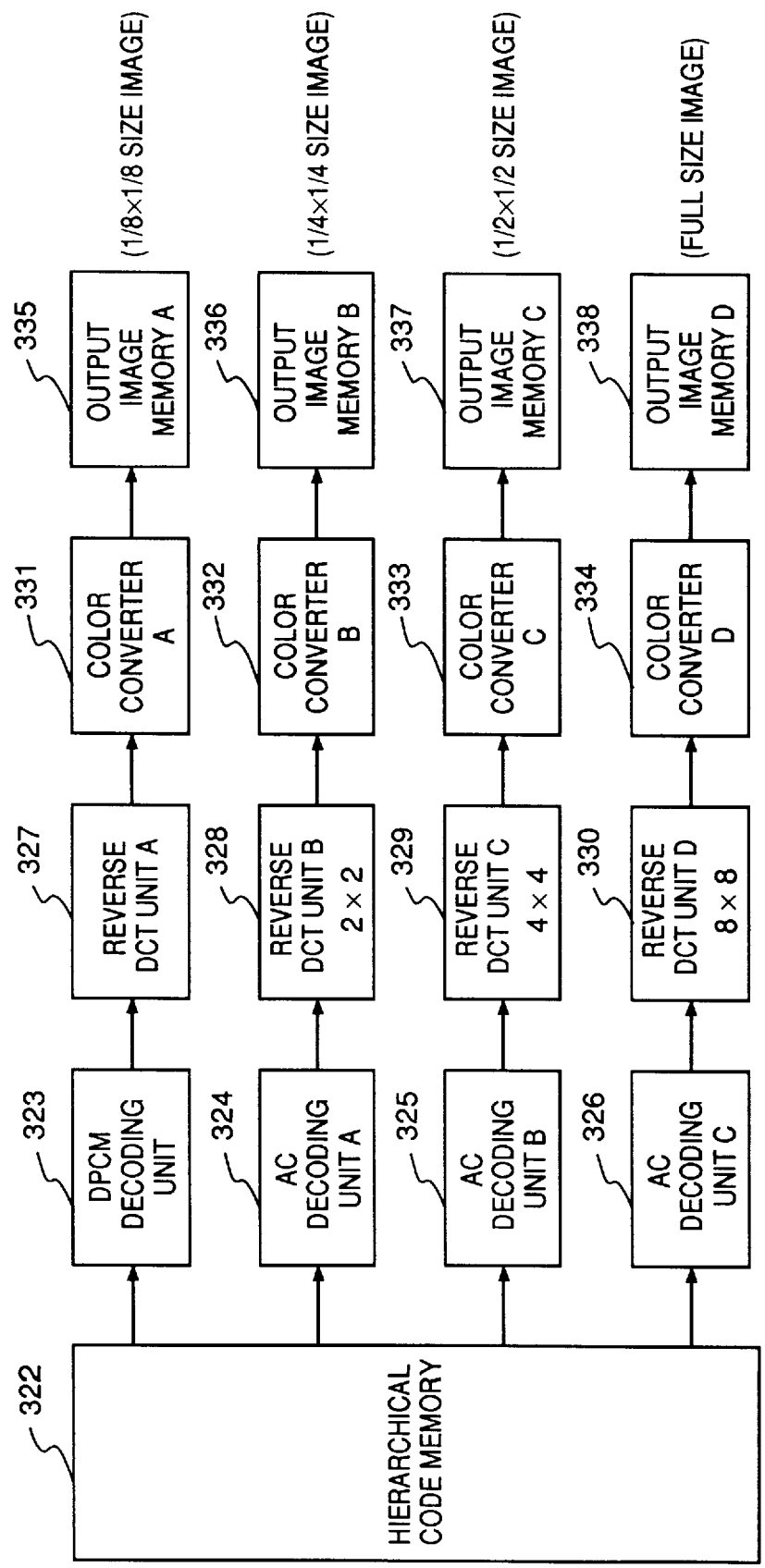
FIG. 27 is a block diagram illustrating a configuration of a display and output processing unit according to the ninth embodiment.

FIG. 27 is a block diagram illustrating a constitution of a display for displaying the hierarchical coded data. In FIG. 27, the hierarchical code memory 322 has the same construction as in FIG. 25, and it stores the hierarchical coded data generated by the hierarchical encoding unit described with reference to FIG. 25.

A DPCM decoding unit 323 decodes and inverse-quantizes the coded data which is encoded by the DPCM encoding unit 318 shown in FIG. 25. Accordingly, only the DC component out of the 8×8 DCT coefficients is decoded, then applied with inverse DCT process at an inverse DCT unit A 327, thus ⅛×⅛ size YUV image data is obtained. The ⅛×⅛ size YUV image data is converted into RGB image data at a color converter A 331, and the RGB image data is stored in an output image memory A 335 as ⅛×⅛ size image data.

An AC decoding unit A 324 decodes and inverse-quantizes the coded data which is encoded by the AC encoding unit A 319 shown in FIG. 25. Accordingly, a 2×2 coefficient matrix out of 8×8 DCT coefficients is obtained. It is applied with inverse DCT process at an inverse DCT unit B 328, thus ¼×¼ size YUV image data is obtained. The ¼×¼ size YUV image data is converted into RGB image data at a color converter B 332, and the RGB image data is stored in an output image memory B 336 as ¼×¼ size image data.

An AC decoding unit B 325 decodes and inverse-quantizes the coded data which is encoded by the AC encoding unit B 320 shown in FIG. 25. Accordingly, a 4×4 coefficient matrix out of 8×8 DCT coefficients is obtained. It is applied with inverse DCT process at an inverse DCT unit C 329, thus ½×½ size YUV image data is obtained. The ½×½ size YUV image data is converted into RGB image data at a color converter C 333, and the RGB image data is stored in an output image memory C 337 as ½×½ size image data.

An AC decoding unit C 326 decodes and inverse-quantizes the coded data which is encoded by the AC encoding unit C 321 shown in FIG. 25. Accordingly, an 8×8 coefficient matrix is obtained. It is applied with inverse DCT process at an inverse DCT unit D 330, thus full size YUV image data is obtained. The full size YUV image data is converted into RGB image data at a color converter B 332, and the RGB image data is stored in an output image memory C 338 as full size image data.

In the ninth embodiment as described above, by displaying or printing the RGB image data of each hierarchy stored in the output image memories A 335, B 336, C 337, and D 338 on a monitor, a printer, or the like, ⅛×⅛, ¼×¼, ½×½, and full size image output is performed.

Next, referring to FIG. 28, a sequential encoding process in which the hierarchical coded data stored in the hierarchical code memory 322 in FIG. 25 is converted into sequential coded data will be explained.

Figure 28:
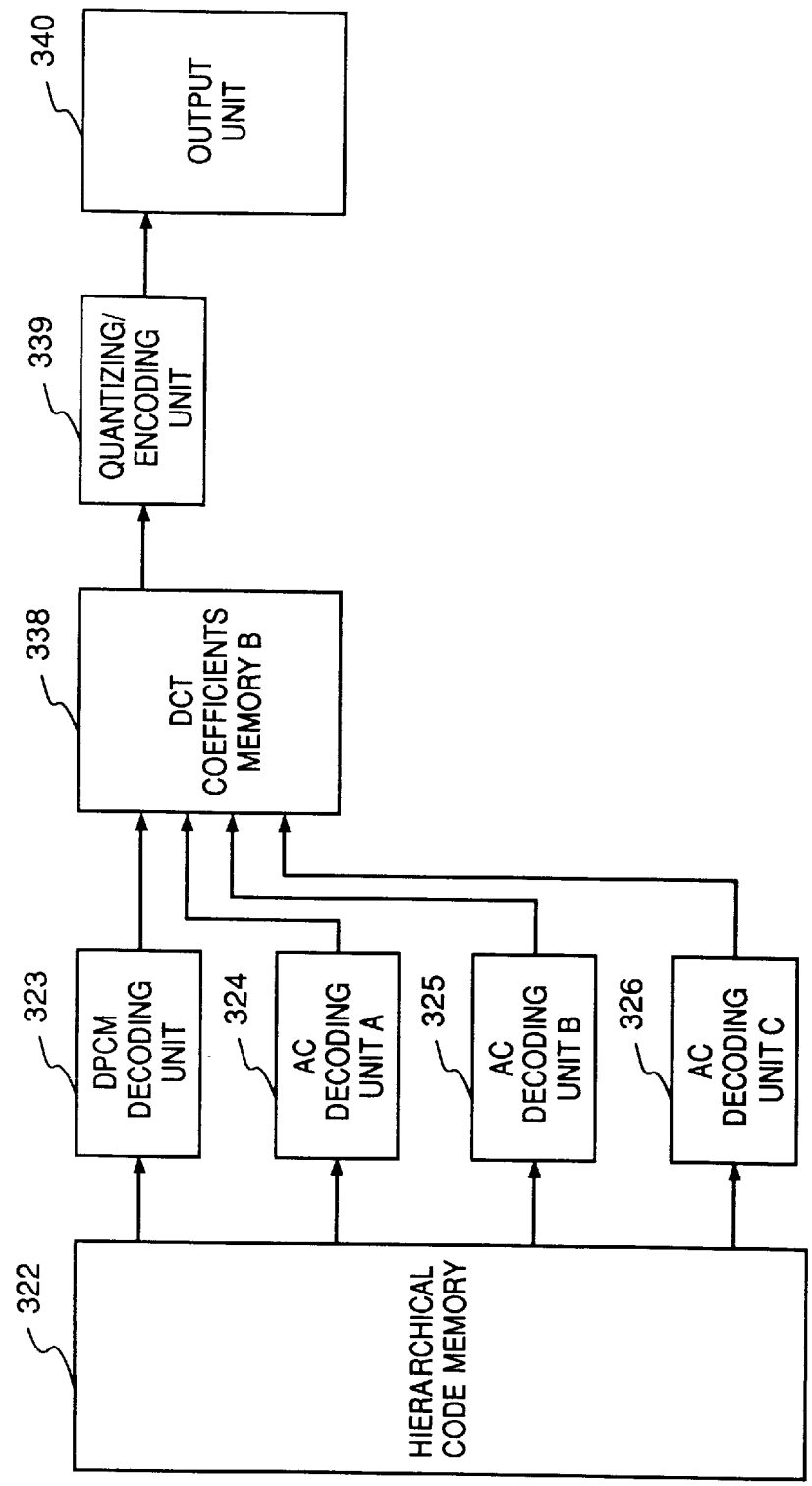
FIG. 28 is a block diagram illustrating a configuration of a sequential encoding unit according to the ninth embodiment.

FIG. 28 is a block diagram illustrating a constitution of a sequential coding unit which converts the hierarchical coded data into the sequential coded data. In FIG. 28, the same elements as in FIG. 27 have the same reference numerals, and their explanations are omitted.

Similarly to the aforesaid image output process shown in FIG. 27, the hierarchical coded data store in the hierarchical code memory 322 is reproduced to DCT coefficients by being decoded and inverse-quantized by the DPCM decoding unit 323, the AC decoding unit A 324, the AC decoding unit B 325, and the AC decoding unit C 326, and further reconstructed into 8×8 DCT coefficients in a DCT coefficient memory B 338. Then, the reconstructed 8×8 DCT coefficients are quantized by a quantizing/encoding unit 339, further Huffman coded. The processed coefficients are outputted to an output unit 340, such as a communication line and a storage device, as sequential DCT coded data. It should be noted that the order of zigzag scanning of the 8×8 DCT coefficients in the quantizing/encoding unit 339 is the same as in FIG. 26A.

In the ninth embodiment as described above, it becomes possible to convert hierarchical data of four hierarchies into sequential coded data. Note that, in the ninth embodiment, the sequential coded data outputted to the output unit 340 in FIG. 28 is identical to the sequential coded data inputted from the input unit 311 in FIG. 25.

Next, referring to FIG. 29, the Huffman coding process of a DC component in the DPCM encoding unit 315 in FIG. 25 will be described.

Figure 29:
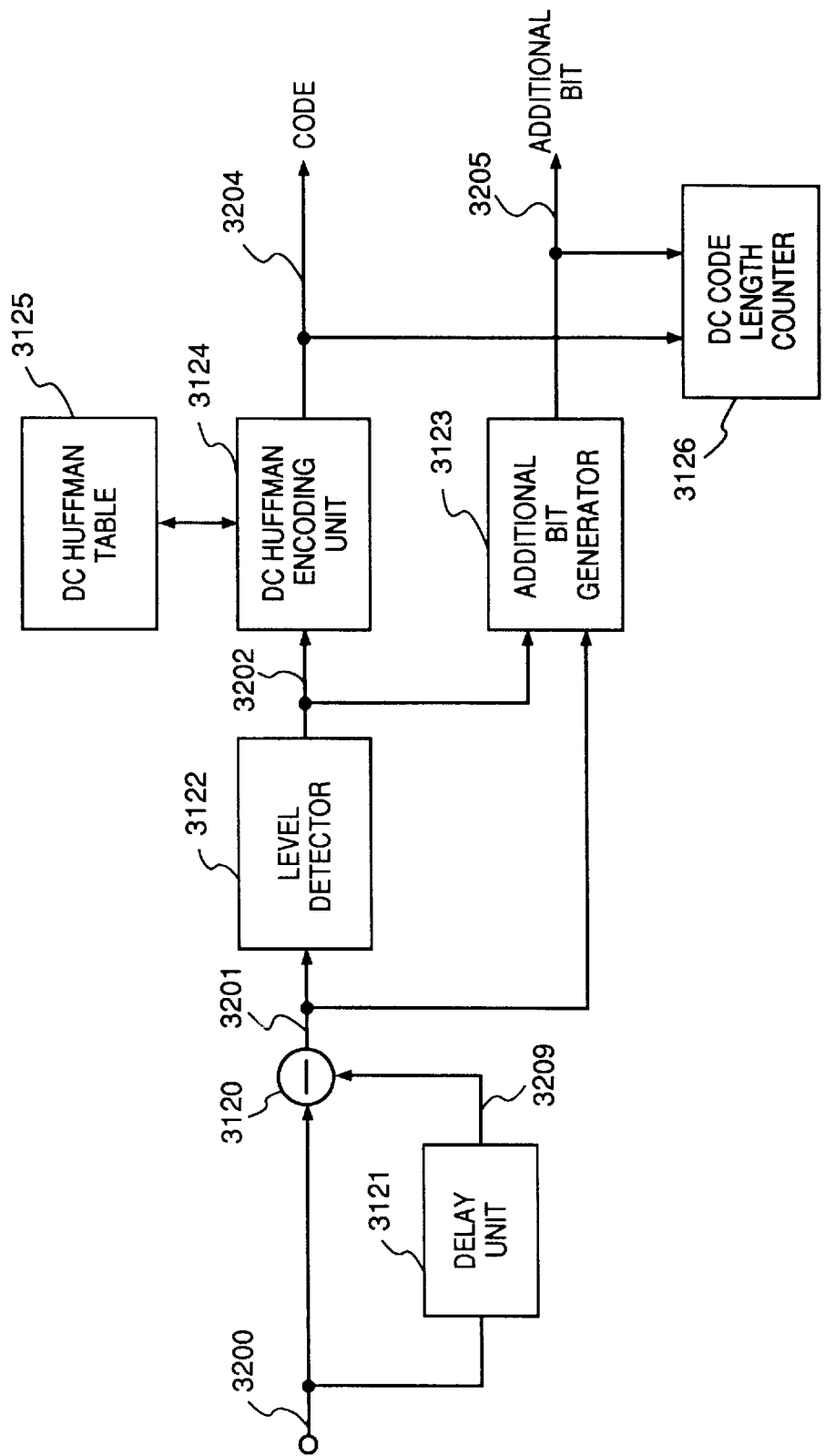
FIG. 29 is a block diagram illustrating a detailed configuration of a DC component coding unit of DCT coefficients according to the ninth embodiment.

FIG. 29 is a block diagram illustrating a detailed constitution of a Huffman encoding unit for a DC component in the DPCM encoding unit 318 in FIG. 25.

DC component data 3200, quantized by a quantizing unit (not shown) in the DPCM encoding unit 318 in FIG. 25 is inputted to a subtractor 3120, where subtraction process is applied to the DC component and the output 3209, data of one block previous, from a delay unit 3121, then the difference data 3201 is outputted. The difference data 3201 is inputted to a level detector 3122 and an additional bit generator 3213. The level detector 3122 divide the difference data 3201 into groups depending on its level, and output the group referred as 3202 into the DC Huffman encoding unit 3124. In the DC Huffman encoding unit 3214, a code 3204 corresponding to the inputted group number is decided with reference to the DC Huffman table 3125, and outputted.

Meanwhile, in the additional bit generator 3123, there is generated a discrimination signal which indicates a predetermined level of the group on the basis of the group 3202 and the difference data 3201, and the signal is outputted as an additional bit 3205. Further, the code 3204 and the additional bit 3205 are inputted to a DC code length counter 3126, and their code lengths are counted.

Next, referring to FIG. 30, a Huffman coding process of AC components in the AC encoding units A 319, B 320, and C 321 in FIG. 25 will be described.

Figure 30:
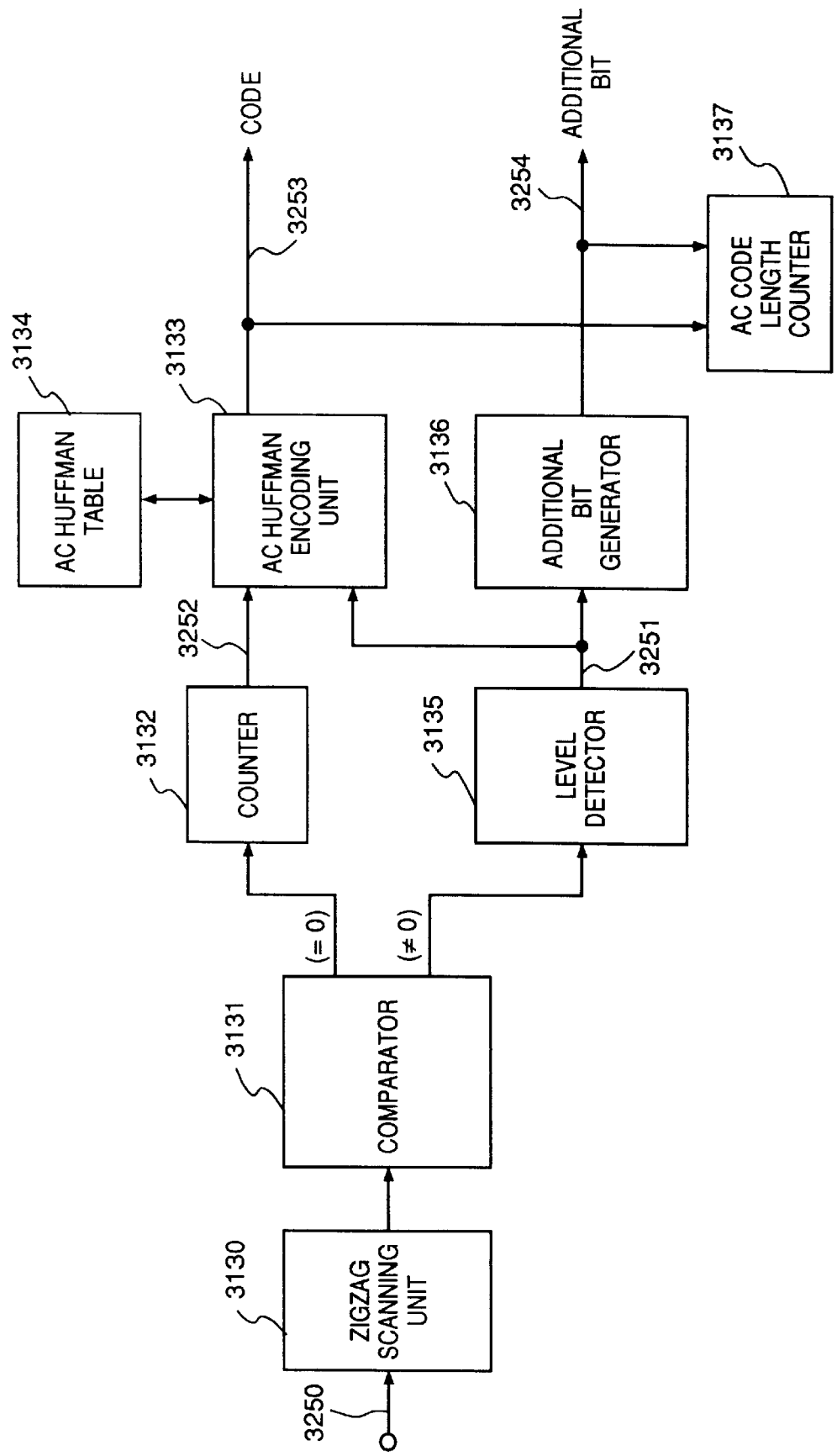
FIG. 30 is a block diagram illustrating a detailed configuration of an AC component coding unit of DCT coefficients according to the ninth embodiment.

FIG. 30 is a block diagram illustrating a detailed constitution of a Huffman encoding unit for AC components in the AC encoding unit A319, B320, and C321.

AC component data 3250, quantized by a quantizing unit (not shown) of the AC encoding units A 319, B 320, and C 321 in FIG. 25 is inputted to a zigzag scanning unit 3130, where the AC components are scanned in the order shown in FIGS. 26A to 26E. The scanned coefficients are outputted to a comparator 3131. The comparator 3131 determines whether or not the inputted AC component is "0". If the AC component is determined as "0" in the comparator 3131, a counter 3132 counts up, and the counted number is outputted to an AC Huffman encoding unit 3133 as a zero run length. Whereas, if the AC component is not "0", then the level of the AC component is divided into groups at a level detector 3135, and a group 3251 is outputted to the AC Huffman encoding unit 3133 and an additional bit generator 3136.

In the AC Huffman encoding unit 3133, a code 3253, corresponding to the group 3251 inputted from the level detector 3135 and the count number of zeros which is inputted from the counter 3132, is decided with reference to the code table of an AC Huffman table 3134 and outputted.

Further, in the additional bit generator 3136, there is generated a discrimination signal indicating a predetermined level of the group shown in the group 3251 inputted from the level detector 3135, and the signal is outputted as an additional bit 3254. Furthermore, the code 3253 and the additional bit 3254 are counted their code lengths by an AC code length counter 3137.

According to the ninth embodiment as described above, it is possible to convert data between sequential coded data and hierarchical coded data without using a memory of large capacity for intermediate processing, and without deteriorating quality of an image.

<Tenth Embodiment>

A tenth embodiment of the present invention will be described below.

In the aforesaid ninth embodiment, the hierarchical coding process of four hierarchies, namely, a DC component, 2×2 DCT coefficients, 4×4 DCT coefficients, and 8×8 DCT coefficients is performed. In the tenth embodiment, since sequential data is the data for final output, such as printing, it is stored unprocessed, and a case where data of three hierarchies, DC, 2×2 DCT, and 4×4 DCT is generated as sub-information is described with reference to FIG. 31.

Figure 31:
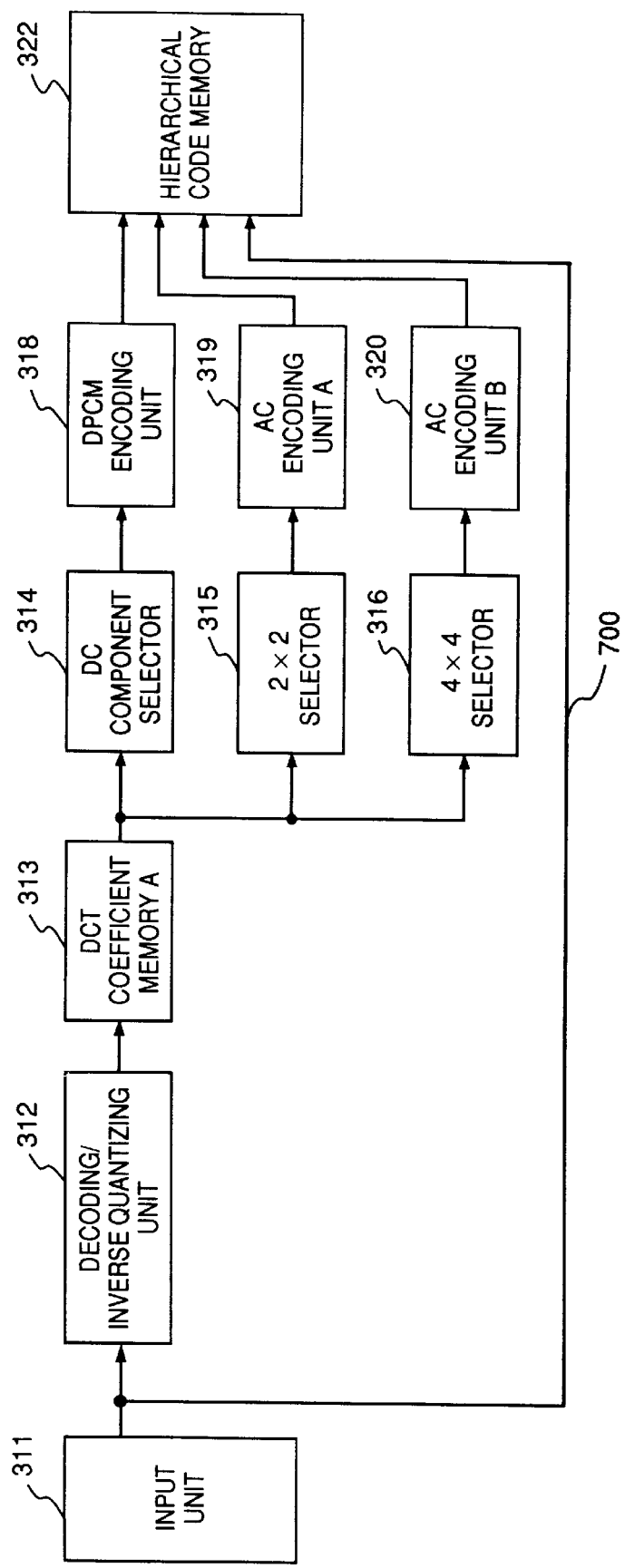
FIG. 31 is a block diagram illustrating a configuration of a hierarchical encoding unit according to a tenth embodiment of the present invention.

FIG. 31 is a block diagram illustrating a constitution of the hierarchical coding unit which converts sequential coded data into hierarchical coded data in an image processing apparatus according to the tenth embodiment.

In FIG. 31, the same elements as in FIG. 25 of the aforesaid ninth embodiment have the identical reference numerals, and descriptions on those element are omitted.

In FIG. 31, a signal 700 inputted from the input unit 31 is sequential coded data, and directly stored in the hierarchical code memory 322. Beside the signal 700, data which is stored in the hierarchical code memory 322 is DC, 2×2 DCT, and 4×4 DCT coded data. 8×8 DCT coded data is not generated in the tenth embodiment.

According to the tenth embodiment as described above, th amount of hierarchical coded data to be stored in the hierarchical code memory 322 is larger than the amount in the ninth embodiment, however, the sequential coding process shown in FIG. 28 in the ninth embodiment becomes unnecessary during outputting an image to a device, such as a printer, which uses sequential image data, thus the unprocessed sequential coded data of the signal 700 can be outputted from the hierarchical code memory 322. Accordingly, the size of an apparatus can be minimized as well as the processing time can be shortened.

<Eleventh Embodiment>

An eleventh embodiment of the present invention will be described below.

In the above-described first and tenth embodiments, conversion of hierarchical coding data into four hierarchies and three hierarchies are explained, and the possible smallest reduction ratio during the conversion is ⅛. Thus, in the eleventh embodiment, a DC component of each DCT coefficient block is used and the number of hierarchies of hierarchical coded data is increased to realize to perform further reduction of an image.

A configuration of a hierarchical encoding unit according to the eleventh embodiment is realized by changing a method of selecting a DC component selected in the DC component selector 314 in FIG. 25 in the aforesaid ninth embodiment.

In the eleventh embodiment, four 8×8 DCT coefficient blocks are used as one set of sub-block in order to increase a number of hierarchies. A construction of a plurality of 8×8 DCT coefficient blocks according to the eleventh embodiment is shown in FIG. 32.

Figure 32:
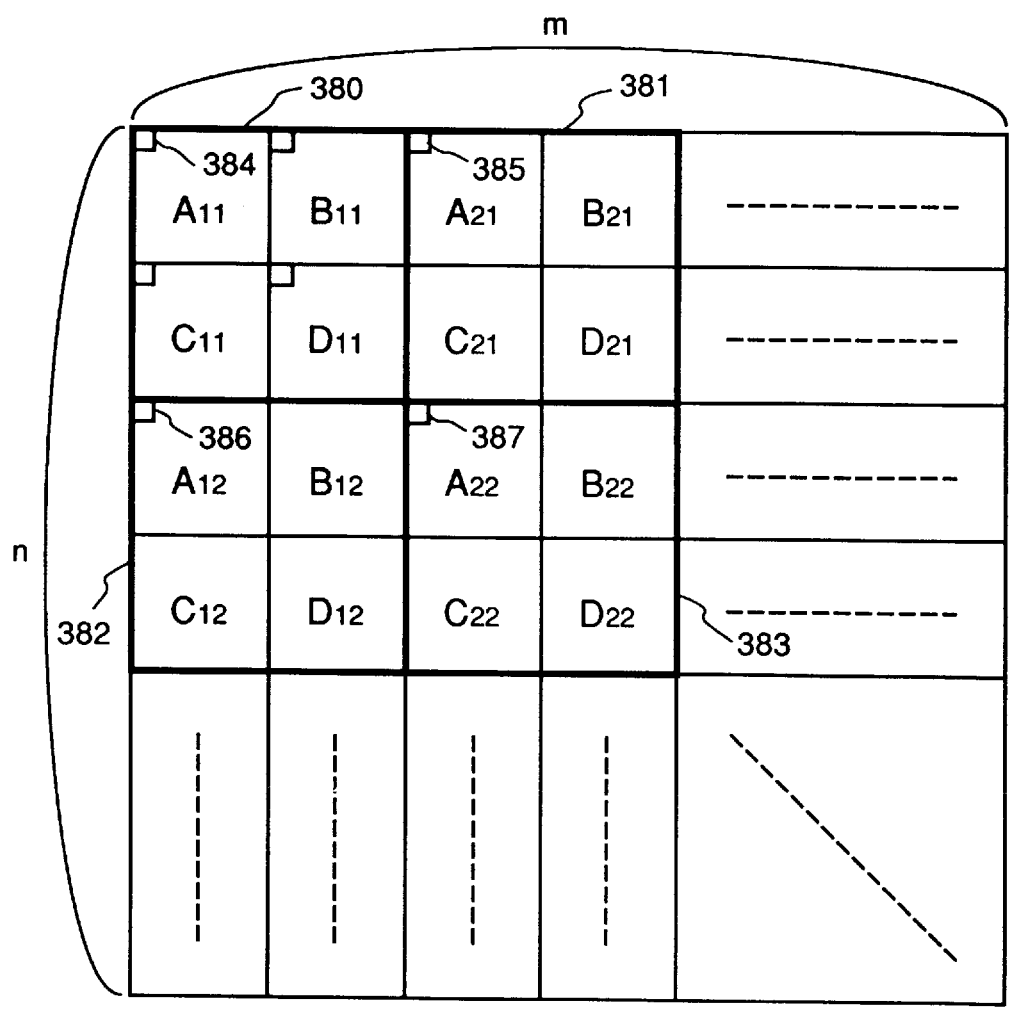
FIG. 32 is a matrix showing a configuration of a sub-block consists of DCT coefficient blocks according to an eleventh embodiment of the present invention.
Figure 33:
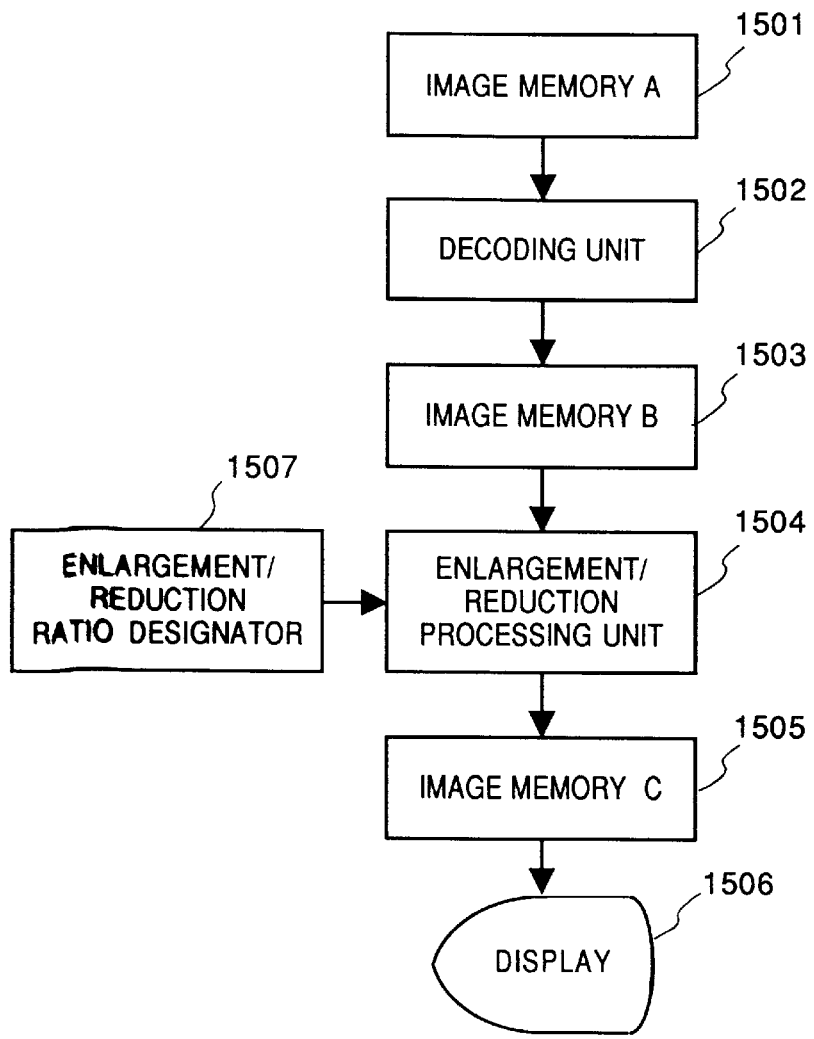
FIG. 33 is a block diagram illustrating a configuration of a conventional image processing apparatus.
Figure 34:
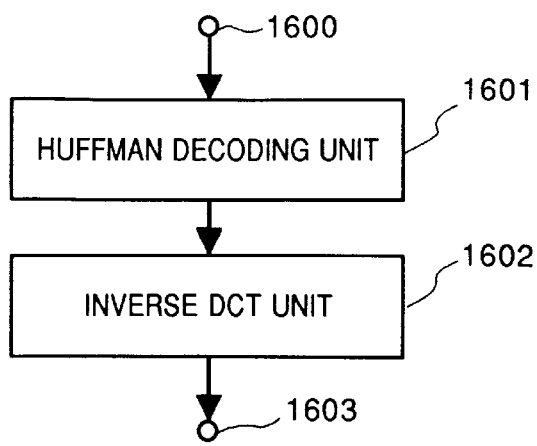
FIG. 34 is a block diagram illustrating a detailed configuration of a decoding unit of the conventional image processing apparatus.
Figure 35:
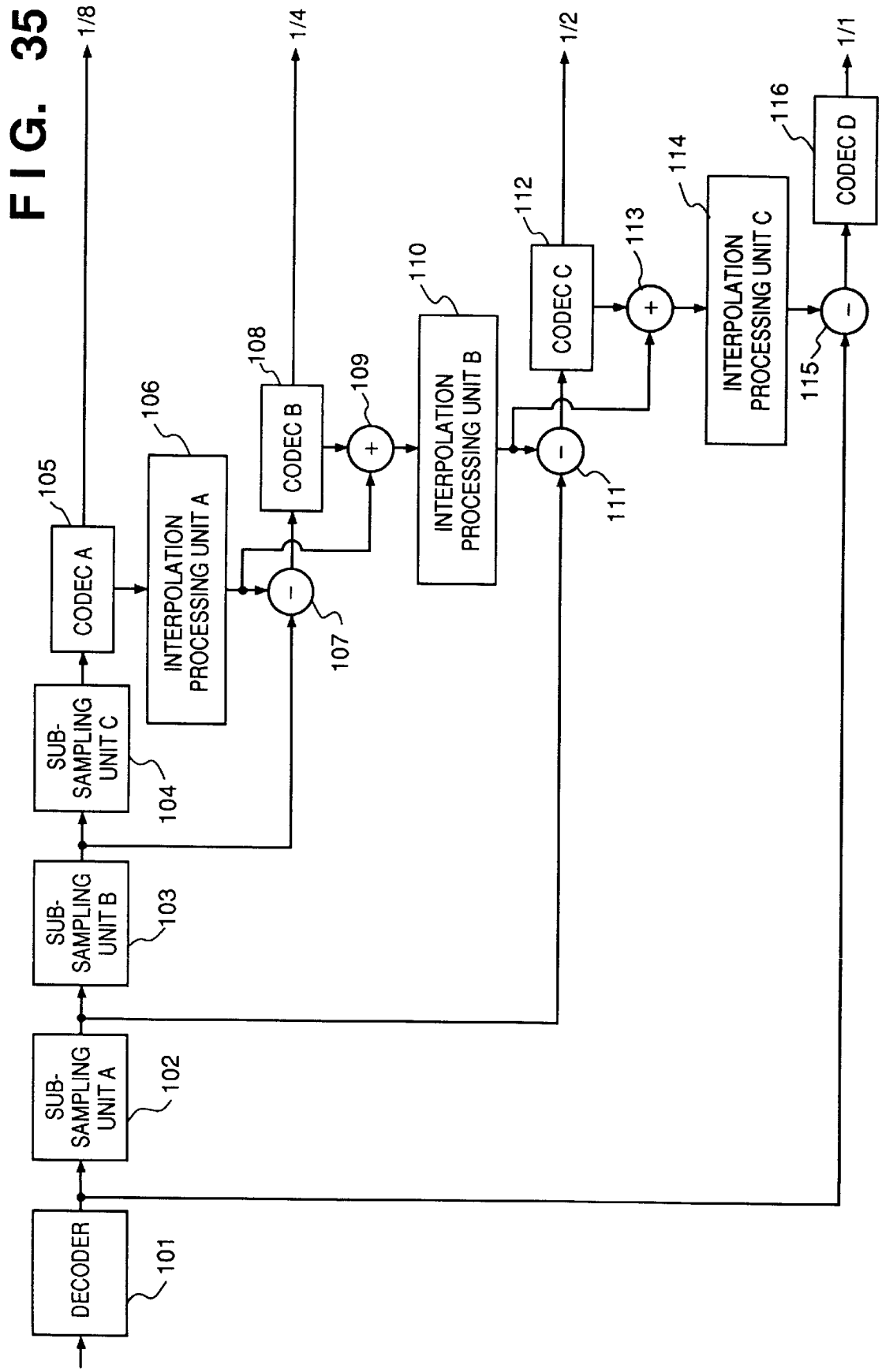
FIG. 35 is a block diagram illustrating a configuration of a conventional hierarchical encoding unit.
Figure 36:
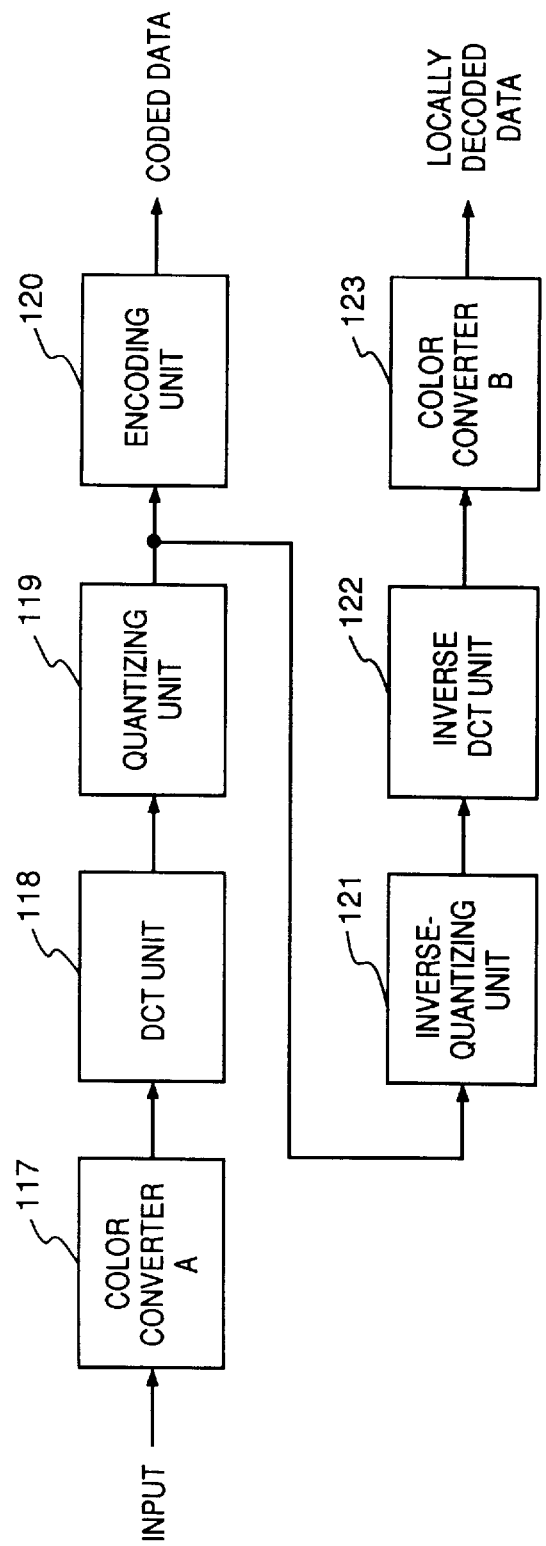
FIG. 36 is a block diagram illustrating a detailed structure of a CODEC of the conventional hierarchical encoding unit.

In FIG. 32, reference numeral 380 denotes a set of sub-block which is composed of four 8×8 DCT coefficient blocks, A11, B11, C11, and D11. Similarly, reference numerals 381, 382, and 383 denotes sub-blocks each of which is composed of four 8×8 DCT coefficient blocks. Likewise, all the DCT coefficient block is divided into n×m sub-blocks.

In the eleventh embodiment, when hierarchical coded data of 1/16×1/16 is needed, a DC component 384 in a left upper block All of a sub-block 380 and a DC component 385 in a block A21 of a sub-block 381, and a DC component 386 in a block A12 of a sub-block 383, and a DC component 387 in a block A22 of a sub-block are applied with DPCM encoding process in the DPCM encoding unit 318 in FIG. 25, then stored in the hierarchical code memory 322. Accordingly, the stored data is the 1/16×1/16 hierarchical coded data.

In order to obtain ⅛×⅛ hierarchical coded data, DC components are extracted from each block, B11, C11, and D11 in the sub-block 380, for instance, and the differences between these DC components and the DC component 384 of All are applied with the DPCM encoding process in the DPCM encoding unit 318, then stored in the hierarchical code memory 322. The similar process is applied to all other sub-blocks.

Regarding ¼×¼ size hierarchical coded data or larger size data, it is generated by encoding AC components of each block, similarly to the aforesaid ninth embodiment.

Further, in the eleventh embodiment, the method to obtain ⅛×⅛ size hierarchical coded data is not limited to the method described above, but can be a method of extracting each DC component from block B21, C21, D21 in the sub-block 381 and applying DPCM encoding process to the differences between the extracted DC components and each DC components of B11, C11, and D11 in the previous sub-block 380, for instance.

Further, in FIG. 32, four DCT coefficient blocks construct a single sub-block, however, the number of block to construct can be altered. For example, assuming that sixteen DCT coefficient blocks compose a single sub-block and the same process as described above is performed, 1/32×1/32 size hierarchical coded data can be obtained. Similarly, it is possible to reduce the size of an image to 1/64×1/64, 1/128×1/128, and so on.

According to the eleventh embodiment as described above, it is possible to generate coded data of more hierarchies, thus to generate an image which is reduced in accordance with a smaller reduction ratio.

According to the ninth to eleventh embodiments as described above, it is possible to perform ordinary conversion as well as inverse conversion between sequential coded data and hierarchical coded data without using a memory of large capacity and causing deterioration of the quality of an image during conversion, namely, reversible conversion can be performed.

It should be noted that the image processing method and apparatus according to the first to eleventh embodiment is applicable not only to processing of a still picture but also a moving picture. In other words, the aforesaid hierarchical encoding can be applied to each frame or each field constructing a moving picture.

Further, since it is possible to reduce the required capacity of memory to be used in the image processing apparatus of the present invention, cost of manufacturing the apparatus can be reduced.

Note that the image memory A10, A20 and the input unit 311 can be provided with coded data from a host computer, a communication line, or the like. Further, the coded data can be data stored in recording medium, such as a magneto-optical disk and CD-ROM.

Furthermore, if the coded data is based on color image data by (Y, Cr, Cb) and (L*, a*, b*) notation, the aforesaid process can be performed on each color component.

Further, the coded data is not limited to DCT data, but can be any kind of data as long as it is converted based on orthogonal conversion.

Furthermore, it is not limited to process with the Huffman coding method, but can be other coding method as long as data is encoded for each frequency component.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing method by an image processing apparatus which decodes coded image data generated from encoding image data by a discrete cosine transform (DCT) coding method as a predetermined block unit, comprising:
   a ratio setting step of setting an enlargement/reduction ratio;
   an extracting step of extracting DCT coefficients to be decoded on the basis of the ratio set at said ratio setting step in a single block;
   a decoding step of decoding the DCT coefficients extracted at said extracting step;
   an inverse DCT step of reproducing an image by applying inverse DCT to the DCT coefficients decoded at said decoding step; and
   a pointing step of moving a pointer to a start position of a next block after the inverse DCT of a single block is completed by said inverse DCT step.

2. The image processing method according to claim 1, wherein the DCT coefficients extracted at said extracting step includes a DC component.

3. The image processing method according to claim 2, wherein a number of DCT coefficients to be decoded in a single block is set at said extracting step.

4. The image processing method according to claim 1, wherein a ratio represented by n/N (n≦N; N and n are positive integers) is decided at said ratio setting step when a block size is N×N.

5. The image processing method according to claim 1 further comprising a block length determining step of determining all block lengths of the coded image data, wherein, at said pointing step, the pointer points to a start position of a next block by referring to each block length determined at said block length determining step.

6. The image processing method according to claim 1 further comprising a block length changing step of changing all blocks of the coded image data into blocks of a predetermined block length,
   wherein, at said decoding step, the coded image data changed to the data of the predetermined block length at said block length changing step is decoded, and
   wherein the pointer points a start position of a next block by referring to the predetermined block length at said pointing step.

7. The image processing method according to claim 1 further comprising an end of block code (EOB) converting step of converting successive zero run length (ZRL) codes and a single EOB code in a block of the coded image data into a single EOB code,
   wherein the coded image data converted at said EOB converting step is decoded at said decoding step.

8. An image processing method by an image processing apparatus which decodes and outputs an coded image data encoded by a hierarchical coding method by N×N block unit (N is a positive integer), comprising:
   a ratio setting step of setting an enlargement/reduction ratio Z;
   a hierarchy setting step of setting a hierarchy n (n is a positive integer) such that n/N (n≦N) becomes closest to the ratio Z set at said ratio setting step;
   a decoding step of decoding the coded image data into data of a n/N×n/N size on the basis of the hierarchy n set at said hierarchy setting step; and
   an enlargement/reduction step of changing sizes of the image data decoded at said decoding step so as to correspond to the ratio Z set at said ratio setting step.

9. The image processing method according to claim 8, wherein the coded image data is encoded by the DCT coding method, and wherein n×n DCT coefficients are decoded and applied with inverse DCT at said decoding step.

10. The image processing method according to claim 8, wherein the set n in a hierarchy is a largest number among positive integers which satisfies the condition, n/N<Z, at said hierarchy setting step.

11. The image processing method according to claim 8, wherein the set n in a hierarchy satisfies a condition, (n−1)/N<Z<n/N, at said hierarchy setting step.

12. The image processing method according to claim 11, wherein the coded image data is decoded to data of two sizes, a (n−1)/N×(n−1)/N size and n/N×n/N size, at said decoding step, and wherein the decoded data whose size is closer to the ratio Z out of the decoded data of the two decoded at said decoding step is further changed in size at said enlargement/reduction step.

13. The image processing method according to claim 8, wherein the hierarchy n is set by referring to an enlargement/reduction designation table which designates process of enlargement/reduction based on the ratio Z at said hierarchy setting step.

14. An image processing method comprising:
   a decoding step of decoding coded data into M×M DCT coefficients (M is a positive integer);
   a DCT coefficient extracting step of extracting N×N DCT coefficients (N is a positive integer) out of the M×M DCT coefficients (N<M);
   a hierarchical coding step of generating hierarchical coded data by encoding the N×N DCT coefficients extracted at said DCT coefficient extracting step; and
   a hierarchical decoding step of decoding the hierarchical coded data encoded at said hierarchical coding step to obtain N×N DCT coefficients.

15. The image processing method according to claim 14 further comprising an entire decoding step of decoding input sequential DCT coded data to obtain M×M DCT coefficients,
   wherein, at said DCT coefficient extracting step, N×N DCT coefficients are extracted out of the M×M DCT coefficients (N=M/K; K is a positive integer) decoded at said entire decoding step,
   wherein said DCT coefficient extracting step is performed for each value of N, and
   wherein said hierarchical decoding step differs depending upon the value of N.

16. The image processing method according to claim 14 further comprising a reduced image producing step for generating N/M×N/M size reduced image data by applying inverse DCT to the N×N DCT coefficients decoded at said hierarchical decoding step, wherein said reduced image producing step differs depending upon the value of N.

17. The image processing method according to claim 14 further comprising a sequential coding step of sequentially encoding the N×N DCT coefficients decoded at said hierarchical decoding step, wherein said sequential coding step differs depending upon the value of N.

18. The image processing method according to claim 15, wherein, at said DCT coefficient extracting step, N×N DCT coefficients are extracted from the M×M coefficients decoded at said entire decoding step, and wherein all the unprocessed sequentially input DCT coded data becomes M×M hierarchical coded data.

19. The image processing method according to claim 15, wherein M=8×2n (n is a positive integer including 0) at said entire decoding step, and wherein N=M/K (K=2n) at said DCT coefficient extracting step.

20. An image processing apparatus which decodes coded image data generated by encoding image data by utilizing a discrete cosine transform (DCT) coding method by a predetermined block unit, comprising:

ratio setting means for setting an enlargement/reduction ratio;

extracting means for extracting DCT coefficients to be decoded on the basis of the enlargement/reduction ratio set by said ratio setting means in a single block;

decoding means for decoding the DCT coefficients extracted by said extracting means;

inverse DCT means for reproducing an image by applying inverse DCT to the DCT coefficients decoded by said decoding means; and pointing means for moving a pointer to a start position of a next block after the inverse DCT of a single block is completed by said inverse DCT means.

21. The image processing apparatus according to claim 20, wherein the DCT coefficients extracted by said extracting means includes a DC component.

22. The image processing apparatus according to claim 21, wherein said extracting means sets a number of DCT coefficients to be decoded in a single block.

23. The image processing apparatus according to claim 20, wherein said ratio setting means decides an enlargement/reduction ratio represented by n/N (n≦N; N and n are positive integers) when a block size is N×N.

24. The image processing apparatus according to claim 20 further comprising block length determining means for determining all block lengths of the coded image data, wherein said pointing means points to a start position of a next block by referring to each block length determined by said block length determining means.

25. The image processing apparatus according to claim 20 further comprising block length changing means for changing all blocks of the coded image data into blocks of a predetermined block length, wherein said decoding means decodes the coded image data changed to the data of the predetermined block length by said block length changing means, and wherein said pointing means points to a start position of a next block by referring to the predetermined block length.

26. The image processing apparatus according to claim 20 further comprising end of block code (EOB) converting means for converting successive zero run length (ZRL) codes and a single EOB code in a block of the coded image data into a single EOB code, wherein said decoding means decodes the coded image data converted by said EOB converting means.

27. An image processing means which decodes and outputs coded image data encoded by a hierarchical coding method by N×N block unit (N is a positive integer), comprising:

ratio setting means for setting an enlargement/reduction ratio Z;

hierarchy setting means for setting a hierarchy n (n is a positive integer) such that n/N (n≦N) becomes closest to the ratio Z set by said ratio setting means;

decoding means for decoding the coded image data into data of a n/N×n/N size on the basis of the hierarchy n set by said hierarchy setting means; and enlargement/reduction means for changing sizes of the image data decoded by said decoding means so as to correspond to the ratio Z set by said ratio setting means.

28. The image processing apparatus according to claim 27, wherein the coded image data was encoded by the DCT coding method, and wherein said decoding means decodes n×n DCT coefficients and applies inverse DCT.

29. The image processing apparatus according to claim 27, wherein said hierarchy setting means sets n in a hierarchy to a largest number among positive integers which satisfies a condition, n/N<Z.

30. The image processing apparatus according to claim 27, wherein said hierarchy setting means sets n in a hierarchy which satisfies a condition, (n−1)/N<Z<n/N.

31. The image processing apparatus according to claim 30, wherein said decoding means decodes the coded image data into data of two sizes, a (n−1)/N×(n−1)/N size and n/N×n/N size, and wherein said enlargement/reduction means further changes a size of the decoded data whose size is closer to the ratio Z out of the decoded data of the two decoded by said decoding means.

32. The image processing apparatus according to claim 27, wherein said hierarchy setting means sets the hierarchy n by referring to an enlargement/reduction designation table which designates process of enlargement/reduction based on the ratio Z.

33. An image processing apparatus comprising:

decoding means for decoding coded data into M×M DCT coefficients (M is a positive integer);

DCT coefficient extracting means for extracting N×N DCT coefficients (N is a positive integer) out of the M×M DCT coefficients (N<M);

hierarchical coding means for generating hierarchical coded data by encoding the N×N DCT coefficients extracted by said DCT coefficient extracting means; and hierarchical decoding means for decoding the hierarchical coded data encoded by said hierarchical coding means to obtain N×N DCT coefficients.

34. The image processing apparatus according to claim 33 further comprising entire decoding means for decoding input sequential DCT coded data to obtain M×M DCT coefficients, wherein said DCT coefficient extracting means selects N×N DCT coefficients out of the M×M DCT coefficients (N=M/K; K is a positive integer) decoded by said entire decoding means, wherein there exist a plurality of said DCT coefficient extracting means each of which corresponds to each value of N, and wherein there exist a plurality of said hierarchical decoding means each of which corresponds to a value of N.

35. The image processing apparatus according to claim 33 further comprising reduced image producing means for generating N/M×N/M size reduced image data by applying inverse DCT to the N×N DCT coefficients decoded by said hierarchical decoding means, wherein there exist a plurality of said reduced image producing means each of which corresponds to a value of N.

36. The image processing apparatus according to claim 33 further comprising sequential coding means for sequentially encoding the N×N DCT coefficients decoded by said hierarchical decoding means, wherein there exist a plurality of said sequential coding means each of which corresponds to a value of N.

37. The image processing method according to claim 34, wherein said DCT coefficient extracting means extracts the N×N DCT coefficients from the M×M coefficients decoded by said entire decoding means, and wherein all the unprocessed sequentially input DCT coded data becomes M×M hierarchical coded data.

38. The image processing apparatus according to claim 34, wherein M=8×2n (n is a positive integer including 0), and wherein N=M/K (K=2n) by said entire decoding means.

39. An image processing apparatus comprising:

supply means for supplying S-number of spatial frequency components (S is a positive integer) encoded for each block, where the encoded spatial frequency components are related to each other in said block;

extracting means for extracting T-number of spatial frequency components (T<S; T is a positive integer) encoded for each block; and decoding means for decoding the T-number of spatial frequency components encoded for each block.

40. The apparatus according to claim 39, wherein said supply means is a host-computer.

41. The apparatus according to claim 39, wherein said supply means is a communication line.

42. The apparatus according to claim 39, wherein said supply means is record medium.

43. The apparatus according to claim 39, wherein said spatial frequency components are Huffman-encoded.

44. The apparatus according to claim 39, wherein said extracting means determines T based on an enlargement/reduction ratio.

45. The apparatus according to claim 39, further comprising image forming means for forming an image on the basis of image data decoded by said decoding means.

46. An image processing method comprising:

a supply step of supplying S-number of spatial frequency components (S is a positive integer) enced for each block, where the encoded spatial frequency components are related to each other in said block;

an extracting step of extracting T-number of spatial frequency components (T<S; T is a positive integer) encoded for each block; and a decoding step of decoding the T-number of spatial frequency components encoded for each block.

47. The method according to claim 46, wherein said spatial frequency components are Huffman-encoded.

48. The method according to claim 46, wherein T is determined based on an enlargement/reduction ratio at said extracting step.

49. The method according to claim 46 further comprising an image forming step of forming an image based on image data decoded at said decoding step.

* * * * *

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

It is certified that error appears in the above-identified patent and that said Letters Patent is hereby corrected as shown below:

```
On the title page item,
```

[56] REFERENCES CITED

```
    Foreign Patent Documents
    "1229560 9/1989 Japan" should read --1-229560
        9/1989 Japan--.

Other Publications
    Under "IEICE Transactions", "Resoluction" should read
        --Resolution--.

Attorney, Agency or Firm
    "Fitzpatrick,Cella, Harper & Scinto" should read
        --Fitzpatrick, Cella, Harper & Scinto--.
```

SHEET 2

```
    Figure 2, "DESIDE" should read --DECIDE--.
```

SHEET 7

```
    Figure 8, "COEFFICIETS" should read --COEFFICIENTS--.
```

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

It is certified that error appears in the above-identified patent and that said Letters Patent is hereby corrected as shown below:

SHEET 20

Figure 23, "REFFER" should read --Refer To--.

COLUMN 1

Line 66, "temporary" should read --temporarily--.

COLUMN 2

Line 57, "output" should read --outputs--.

COLUMN 3

Line 8, "at a" should read --at an--.
   Line 67, "extracted" should read --extracting--.

COLUMN 4

Line 33, "convert" should read --converted--.

COLUMN 5

Line 12, "an" should be deleted.

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

It is certified that error appears in the above-identified patent and that said Letters Patent is hereby corrected as shown below:

COLUMN 7

Line 35, "consists" should read --consisting--.

COLUMN 11

Line 53, "is" should be deleted; and "a" should
     read --an--.
  Line 54, "referred as 101 to 110 then a" should read
     --referred to as 101 to 110, and then an--.
  Line 64, "are" should read --is--.

COLUMN 12

Line 19, "find," should read --found,--.

COLUMN 13

Line 61, "the consisting" should read --those--.
  Line 64, "are" should read --is--.

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

Page 4 of 7

It is certified that error appears in the above-identified patent and that said Letters Patent is hereby corrected as shown below:

COLUMN 14

Line 10, "is" should read --are--.
    Line 56, "time" should read --times--.

COLUMN 16

Line 27, "to" should be deleted.
    Line 34, "exceeds" should read --exceed--.

COLUMN 18

Line 1, "find" should read --finds--.
    Line 6, "a" should be deleted.

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

It is certified that error appears in the above-identified patent and that said Letters Patent is hereby corrected as shown below:

COLUMN 19

Line 58, "are" should read --is--.

COLUMN 20

Line 15, "referring" should read --referring to--.
    Line 49, "decide" should read --decides--.
    Line 58, "is" should read --are--.

COLUMN 22

Line 10, "after" should read --after being--.
    Line 11, "stored" should read --is stored--.
    Line 16, "after" should read --after being--.
    Line 20, "a" should read --an--.
    Line 22, "after" should read --after being--.
    Line 23, "stored" should read --is stored--.

COLUMN 25

Line 29, "th" should read --the--.
    Line 63, "sub-block" should read --sub-blocks--.

UNITED STATES PATENT AND TRADEMARK OFFICE
CERTIFICATE OF CORRECTION

PATENT NO. : 5,875,039

DATED : February 23, 1999

INVENTOR(S) : HIDEFUMI OHSAWA ET AL.

It is certified that error appears in the above-identified patent and that said Letters Patent is hereby corrected as shown below:

COLUMN 25 CONTINUED

Line 65, "denotes" should read --denote--.
   Line 67, "block is" should read --blocks are--.

COLUMN 27

Line 38, "includes" should read --include--.

COLUMN 28

Line 4, "an" should be deleted.
   Line 13, "of a" should read --of an--.

COLUMN 30

Line 15, "of a" should read --of an--.
   Line 65, "exist" should read --exists--.

UNITED STATES PATENT AND TRADEMARK OFFICE
CERTIFICATE OF CORRECTION

PATENT NO. : 5,875,039
DATED : February 23, 1999
INVENTOR(S) : HIDEFUMI OHSAWA ET AL.

It is certified that error appears in the above-identified patent and that said Letters Patent is hereby corrected as shown below:

COLUMN 31

Line 1, "exist" should read --exists--.
   Line 8, "exist" should read --exists--.
   Line 15, "exist" should read --exists--.

COLUMN 32

Line 6, "is" should read --is a--.
   Line 17, "enced" should read --encoded--.

Signed and Sealed this

Fifteenth Day of August, 2000

Attest:

Attesting Officer

Q. TODD DICKINSON
Director of Patents and Trademarks